(12) United States Patent
Schiff et al.

(10) Patent No.: US 11,342,775 B2
(45) Date of Patent: May 24, 2022

(54) VOLTAGE MINIMUM ACTIVE PROTECTION CIRCUIT AND METHOD OF OPERATING SAME

(71) Applicant: Intel Corporation, Santa Clara, CA (US)

(72) Inventors: Tod Schiff, Portland, OR (US); Teal Hand, Beaverton, OR (US); Alexander Uan-Zo-Li, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/833,113

(22) Filed: Mar. 27, 2020

(65) Prior Publication Data

US 2020/0227933 A1 Jul. 16, 2020

(51) Int. Cl.
*H02J 7/00* (2006.01)
*G05F 1/573* (2006.01)
*H02M 3/158* (2006.01)

(52) U.S. Cl.
CPC ........ *H02J 7/007182* (2020.01); *G05F 1/573* (2013.01); *H02M 3/1582* (2013.01)

(58) Field of Classification Search
CPC .... H02J 7/0026; H02J 7/0029; H02J 7/00302; H02J 7/00304; H02J 7/00306; H02J 7/00308; H02J 7/0068; H02J 7/007; H02J 7/00712; H02J 7/007182; H02J 7/007184; H02J 7/007186; H02J 7/008; H02J 7/0085; H02J 7/0086; H02J 2207/00; H02J 2207/10; H02J 2207/20; H02J 2207/30; H02J 2207/50; G05F 1/569; G05F 1/571; G05F 1/573; G05F 1/62; H02M 3/02; H02M 3/04; H02M 3/07; H02M 3/135; H02M 3/137; H02M 3/155; H02M 3/156; H02M 3/158; H02M 3/1582; H02M 2003/1566;
(Continued)

(56) References Cited

U.S. PATENT DOCUMENTS

2016/0246316 A1* 8/2016 Lim .......................... H02J 1/00
2018/0109134 A1* 4/2018 Carpenter ............... H02J 7/345
(Continued)

OTHER PUBLICATIONS

Extended European Search Report from European Patent Application No. 20206968.8 dated Mar. 24, 2021, 10 pgs.

*Primary Examiner* — Thienvu V Tran
*Assistant Examiner* — Carlos O Rivera-Perez
(74) *Attorney, Agent, or Firm* — Essential Patents Group, LLP

(57) ABSTRACT

Techniques and mechanisms for supplementing power delivery with a battery. In an embodiment, a voltage is provided at a first node with the battery to power a load circuit. A charger is coupled between the first node and a second node, wherein a capacitor is coupled to provide charge to the charger via the second node. In response to detecting a transition of the voltage below a threshold voltage level, controller logic operates switch circuitry of the charger to provide charge from the capacitor. Such operation maintains the voltage in a range of voltage levels which are each above a minimum voltage level required by the load. At least a portion of the range is below the threshold voltage level. In some embodiments, another voltage at the second node provides a basis for generating a control signal to throttle an operation of the load circuit.

20 Claims, 12 Drawing Sheets

(58) Field of Classification Search
CPC . H02M 2001/0032; H02M 2001/0035; H02M
1/32; H02M 1/36; H02M 3/1566; H02M
1/0032; H02M 1/0035; G06F 1/26; G06F
1/263; G06F 1/28; G06F 1/32; G06F
1/3203; G06F 1/3206; G06F 1/3212;
G06F 1/3234; G06F 1/324; G06F 1/3296;
Y02D 10/00
USPC ............... 323/222–226, 259, 266, 271–277,
323/281–285, 351, 908; 363/50, 56.12,
363/123, 124; 361/18, 78, 79, 86, 87,
361/88–92, 111; 320/103, 104, 124, 125,
320/127–138, 161, 162, 166, 167;
713/300–340
See application file for complete search history.

(56) References Cited

U.S. PATENT DOCUMENTS

2018/0278053 A1\* 9/2018 Uan-Zo-li ........ G01R 19/16542
2020/0004306 A1   1/2020 Uan-Zo-Li

\* cited by examiner

VOLTAGE MINIMUM ACTIVE PROTECTION CIRCUIT AND METHOD OF OPERATING SAME

BACKGROUND

1. Technical Field

This disclosure generally relates to battery recharging and more particularly, but not exclusively, to circuitry to operation of a buck boost charger to regulate voltage during an increased power demand.

2. Background Art

The mobile computing industry is continually moving toward smaller form factors, while at the same time system-on-chip (SoC) solutions are consuming more power, which contributes to the complexity of thermal cooling. As this trend for more power continues and smaller form factor designs with smaller batteries are demanded generation over generation, support for delivering higher peak power is increasingly important.

Many computing systems, such as portable mobile systems or client systems, need to maintain a system voltage above a given minimum voltage level. Power bursts (due to a processor turbo mode, for example) increase the risk that a system voltage ($V_{sys}$) will drop below a minimum allowed system voltage ($V_{sys\_min}$), causing a system black-screen and/or loss of data. These power burst scenarios tend to impose operational restrictions, such as limiting the peak frequency in multi-threaded operation, which affect performance negatively.

Today, many mobile devices are designed with "2S" batteries (having two cells in series), which accommodate small voltage regulator size and a relatively high switching frequency for lower power loss. Larger in-series cell configurations (such as 3S or 4S) are normally reserved for larger systems. As compared to 3S or 4S configurations, 1S or 2S configurations usually maintain a lower system voltage, thus limiting the time and energy available for the platform to maintain peak power before dropping below $V_{sys\_min}$.

Accordingly, higher peak power requirements complicate the use of 1S cell configuration, and even use of 2S batteries is often limited. In addition, power delivery is affected by various resistances which are subject change based on temperature, battery wear-out, and variation between components. For at least these reasons, an increasing premium is placed on improved solutions to accommodate bursts in power demand for mobile applications.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
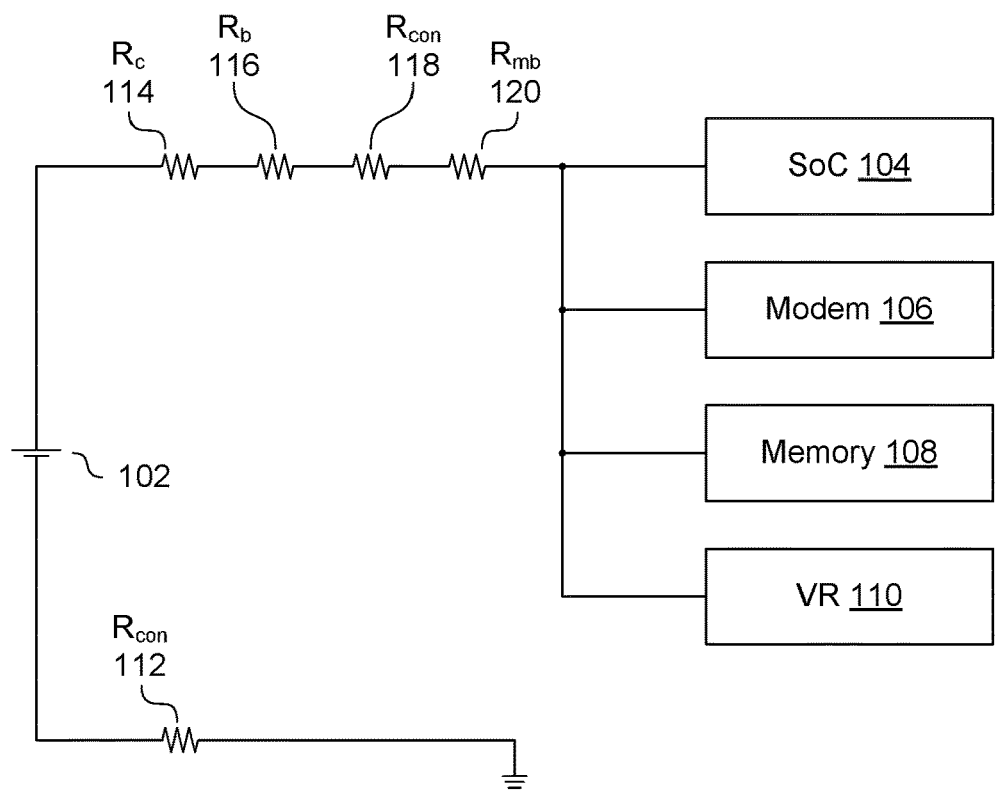
FIGS. 1 and 2 illustrate respective hybrid circuit and functional block diagrams each showing elements of a system to regulate power delivery according to a corresponding embodiment.

Embodiments discussed herein variously provide techniques and mechanisms for supplementing power delivery with a battery. In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including circuitry to provide power with a rechargeable battery.

FIG. 1 shows features of a system 100 to supplement power delivery with a battery according to an embodiment. System 100 illustrates various resistances between one or more battery cells 102 and one or more voltage regulators including the illustrative voltage regulator VR 110 shown. In various embodiments, VR 110 is to facilitate the regulation of a delivery of power to various other circuits of system 110—e.g., including, but not limited to, a system on chip (SoC) 104, a modem 106, a memory 108, or the like. Some example sources of resistance in system 100 include, but are not limited to, a battery cell, a battery connector and sense resistor(s), pass field effect transistor(s), and power delivery traces on a motherboard. For example, resistances in system 100 include one or more of a battery connector resistance $R_{con}$ 112, a resistance $R_c$ 114 of a battery cell (or of an external power supply such as a brick, charger or power supply unit), a battery enclosure resistance $R_b$ 116, a connector resistance $R_{con}$ 118, or a motherboard resistance $R_{mb}$ 120 (due to field effect transistors, a power train, or the like). An amount of such resistances depends, for example, on factors including, but not limited to, a battery configuration (for example, a number of battery cells in series vs. a number of battery cells in parallel), the quality and design of components, wear, temperature, or load step, etc. In some mobile or client systems, an amount of system resistance is in a range between 100 milliOhms (mOhm) and 200 mOhm, for example. In some mobile or client systems, an amount of system resistance is in a range between 50 mOhm and 185 mOhm, for example. In some mobile or client systems, an amount of system resistance is in a range between 110 mOhm and 180 mOhm, for example.

In many computer systems, a change in such resistance (e.g., between 110 mOhm and 185 mOhm) results in a considerable difference in the peak power that a battery is able to support. Furthermore, such a battery is usually required to support a minimum system voltage level $V_{sys\_min}$ to avoid a system black-screen, loss of data, and/or the like. To facilitate power delivery under various conditions, some embodiments variously configure a mode of circuit operation in response to a system voltage $V_{sys}$ transitioning below a predetermined level of a threshold voltage $V_{sys\_th}$. Such a mode regulates the system voltage $V_{sys}$ to be in a range which includes one or more voltage levels between the threshold voltage $V_{sys\_th}$ and the minimum system voltage level $V_{sys\_min}$. For example, in one such embodiment, VR 110 comprises, or is otherwise coupled to control, a charger circuit (not shown) that is operable to switchedly couple an energy storage to battery 102. In this particular context, "switchedly couple" refers to the enabling of a conductive path between two nodes (or other circuit structures) by a configuration of switch circuitry—e.g., wherein "switchedly decoupling" disables such a conductive path.

Figure 2:
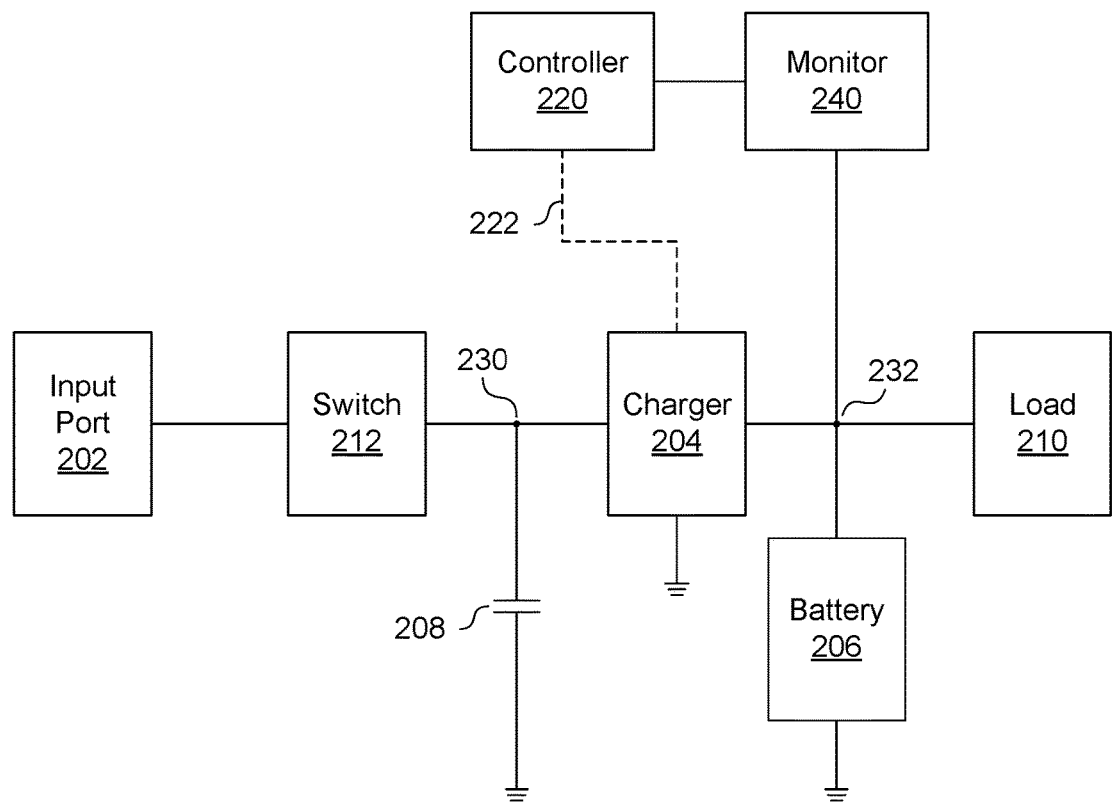

FIG. 2 shows features of a system 200 to regulate a delivery of power according to an embodiment. System 200 is one example of an embodiment wherein a charger circuit is operable to regulate a system voltage in a range of voltage levels, where at least a portion of said range is between a predetermined threshold voltage level $V_{sys\_th}$ and a minimum allowable system voltage level $V_{sys\_min}$. In some embodiments, system 200 comprises a power supply system (for example, a mobile power supply system) that includes features of system 100.

As shown in FIG. 2, system 200 includes an input port 202 (for example, a USB type C connector, USB-C PD, and/or USB-C Thunderbolt enabled port), a charger 204 (for example, a buck-boost charger, or a buck-boost converter), a battery 206, an energy storage 208 (for example, a capacitor), a switch 212 (for example, including one or more power field effect transistors or power FETs, or pass FETs), a monitor 240, and a controller 220. In some embodiments, system 200 further comprises (or alternatively, is to couple to) a system load 210. Alternatively or in addition, some embodiments are implemented entirely with controller circuitry such as that illustrated by controller 220, or (for example) entirely with a combination of controller 220 and monitor 240.

In some embodiments, system 200 is a buck-boost charging system, and charger 204 is a buck-boost charger. Charger 204 provides power to system load 210 via a node 232, and/or is operable to charge battery 206 via node 232 when a power source is connected at input port 202. As illustrated in FIG. 2, a buck-boost configured battery charger such as charger 204 is operable to switchedly decouple the node 230 and node 232. In some embodiments, node 232 (which, for example, is to function as a system power rail) is coupled to the power input port 202 via switches (not shown) of charger 204 and, in some embodiments, via switch 212.

In some embodiments, system load 210 is a mobile computing system, such as, for example, a smartphone, tablet, laptop computer, etc., among others. In one example embodiment, system load 210 includes a processor, a memory, one or more communication devices, and/or any of various other computing device components that are coupled to be selectively powered by rechargeable battery 206 and/or an external power source (not shown in FIG. 2). In some embodiments, battery 206 provides power to system load 210 when an external power source is not available. In some embodiments, battery 206 is a lithium-ion battery pack. In some embodiments, other rechargeable or non-rechargeable batteries are used.

In some embodiments, energy storage 208 is selectively coupled at various times to supplement the voltage provided by battery 206 to system load 210. For example, energy storage 208 includes one or more components for input decoupling of charger 204 in the form of one or more capacitors coupled together (for example, in series). Energy storage 208 is implemented, for example, by one or more individual capacitors coupled together in parallel or in series.

In some embodiments, energy storage 208 is charged to create an energy storage that has the capability of smoothing out peaks of system power. That is, energy storage 208 is available for use as a form of a battery, and battery 206 is able to be supplemented during a peak power scenario. That is, the battery 206 is supplemented by energy storage 208 when the battery nears a low voltage scenario that poses a risk of system failure. In an example scenario according to one embodiment, energy storage 208 is able to be charged up to 20V and the charger 204 bucks the voltage from 20V down to the voltage of the battery to supplement battery 206. In this manner, input decoupling (for example, input decoupling using switch 212 and/or one or more switches of charger 204) is used to facilitate a storage of charge with energy storage device 208.

In some embodiments, energy storage 208 supplements power to system load 210 to maintain the voltage being supplied to system load 210 in a predetermined range of voltage levels. This occurs, for example, when the voltage provided by battery 206 transitions below a predetermined voltage level (represented herein as $V_{sys\_th}$). The predetermined voltage level $V_{sys\_th}$ is a threshold voltage level that, for example, is set above a minimum voltage level (represented herein as $V_{sys\_min}$) that load 210 is able to accommodate. In such a case, when the voltage transitions below (or is expected to transition below) the threshold voltage level $V_{sys\_th}$, energy storage 208 is used by charger 204 to generate the power to supplement the power provided by battery 206 to system load 210.

In an embodiment, the predetermined range of voltage levels is defined by a maximum voltage level (Vrmx) of the range and a minimum voltage level (Vrmn) of the range, where the minimum voltage level Vrmn is equal to or greater than the minimum system voltage level $V_{sys\_min}$, and is less than the threshold voltage level $V_{sys\_th}$. In some embodiments, most voltage levels of the range are between $V_{sys\_th}$ and $V_{sys\_min}$—e.g., where the minimum voltage level (Vrmn) of the range is equal to $V_{sys\_min}$. In various embodiments, for example, a first difference between voltage levels $V_{sys\_th}$, Vrmn is at least 10% of a second difference between voltage levels $V_{sys\_th}$, $V_{sys\_min}$.

In some embodiments, the range of voltage levels spans at least some minimum portion of the difference between voltage levels $V_{sys\_th}$, $V_{sys\_min}$—e.g., wherein voltage level Vrmx is equal to $V_{sys\_th}$, and/or voltage level Vrmn is equal to $V_{sys\_min}$. In other embodiments, the range of voltage levels spans only within some maximum portion of the difference between voltage levels $V_{sys\_th}$, $V_{sys\_min}$. In various embodiments, each voltage level of the range is closer to $V_{sys\_th}$ than to $V_{sys\_min}$—e.g., wherein voltage level Vrmn is equal to $V_{sys\_min}$.

In some embodiments, monitoring hardware (e.g., including circuitry of the illustrative monitor 240 shown) monitors the voltage and/or power provided to system load 210 to determine if the voltage transitions below the predetermined voltage level $V_{sys\_th}$ (or the power goes above the battery capability, for example). In some embodiments, the voltage monitoring hardware monitors the voltage being supplied by battery 206 to system load 210, and also the voltage at node 230. In some embodiments, the voltage monitoring hardware supplements the supply of power to system load 210 when the voltage supplied to system load 210, as monitored by voltage monitoring hardware, transitions below a first threshold voltage level, which is above a minimum voltage level $V_{sys\_min}$ associated with the system load 210. In some embodiments, the voltage monitoring is implemented by separate hardware coupled to charger 204, energy storage 208, and/or system load 210. In some embodiments, the voltage monitoring is implemented by a charger controller that also asserts a signal when the voltage transitions below a predetermined level. In some embodiments, the voltage monitoring is implemented using controller 220.

In some embodiments, current or power is monitored instead of voltage (for example, in order to determine if the voltage provided to system load 210 via node 232 has transitioned or is expected to transition below the predetermined voltage level $V_{sys\_th}$).

In some embodiments, charger 204 charges battery 206 and at times charges energy storage 208 when an AC adapter is not present (for example, at input port 202). In some embodiments, charger 204 charges battery 206 and/or energy storage 208 when the voltage being supplied by battery 206 to system load 210 is above a second threshold level that is higher than another (for example, the first) threshold level $V_{sys\_th}$ that is used to trigger the usage of energy storage 208 to supplement power to system load 210. In such embodiments, charger 204 might not charge energy storage 208 when the voltage being supplied by battery 206 to system load 210 is below the second threshold level, but higher than the first threshold level. In some embodiments, the voltage monitoring hardware monitors the voltage being supplied by battery 206 to system load 210 to determine when charger 204 charges energy storage 208.

In some embodiments, charger 204 maintains a necessary amount of energy in energy storage 208, unless circuitry of load 210—such as a SoC, a CPU, or the like—goes into a low power mode, and it is determined (according to some predefined criteria) that power usage by system load 210 is unlikely to spike to a level sufficient to transition the system voltage below the minimum system requirements.

In some embodiments, switch 212 is used to decouple input port 202 from other circuitry of system 200 (for example, from charger 204 and energy storage 208) when no device is connected to input port 202. For example, switch 212 includes one or more pass FETs (or power FETs) that are operated—e.g., by controller 220—when an external power source (such as a power adapter, or a Type C USB Power Delivery power supply) is coupled to input port 202 to provide power to system load 210. In some embodiments, energy storage 208 is partially discharged to battery 206 when a power adapter is coupled to input port 202. In some embodiments, energy storage 208 is discharged in response to a power adapter being connected to input port 202 but prior to the adapter providing power to system load 210 through input port 202.

In some embodiments, controller 220 is coupled to and controls components of the power delivery system to determine when energy source 208 is to supplement the power provided by battery 206 to system load 210, to charge and/or discharge energy storage 208, as well as to couple and/or decouple components of system 200 at specific times. For example, in some embodiments, controller 220 provides one or more control signals (e.g., including the illustrative control signal 222 shown) to variously operate one or more switches of charger 204. In some embodiments, other control signals (not shown) are provided to operate one or more other switches of system 200, such as switch 212.

In some embodiments, energy storage 208 (or a portion of energy storage 208) is switchedly decoupled from other circuitry of system 200—e.g., with selective operation of switch 212 and/or one or more switches of charger 204—in order to minimize leakage of energy storage 208 and/or to prevent a full discharge of energy storage 208 while a device is connected at input port 202 and switch 212 is turned on.

Although battery 206 is shown as being directly coupled to node 232, in other embodiments, system 200 further comprises other switch circuitry—e.g., including one or more pass FETs (or power FETs)—which is coupled between battery 206 and node 232. In one such embodiment, this other switch circuitry provides for battery 206 to be switchedly decoupled during a delivery of power by charger 204 to load 210—e.g., where such power is provided with energy storage 208 and/or with a power source that is coupled to input port 202.

In some embodiments, when an adapter is connected to input port 202, switch 212 is configured in an on (closed circuit) state, and the voltage of energy storage 208 (at node 230) is the same as the input voltage at input port 202. Charger 204 is then operated, based on control signal 222, to selectively supplement battery 206 with the adapter in a delivery of power to load 210. When there is no adapter coupled to the input port 202, switch 212 is turned off, and charger 204 is operated to selectively supplement battery 206 with energy storage 208 in the delivery of power to load 210.

Figure 3:
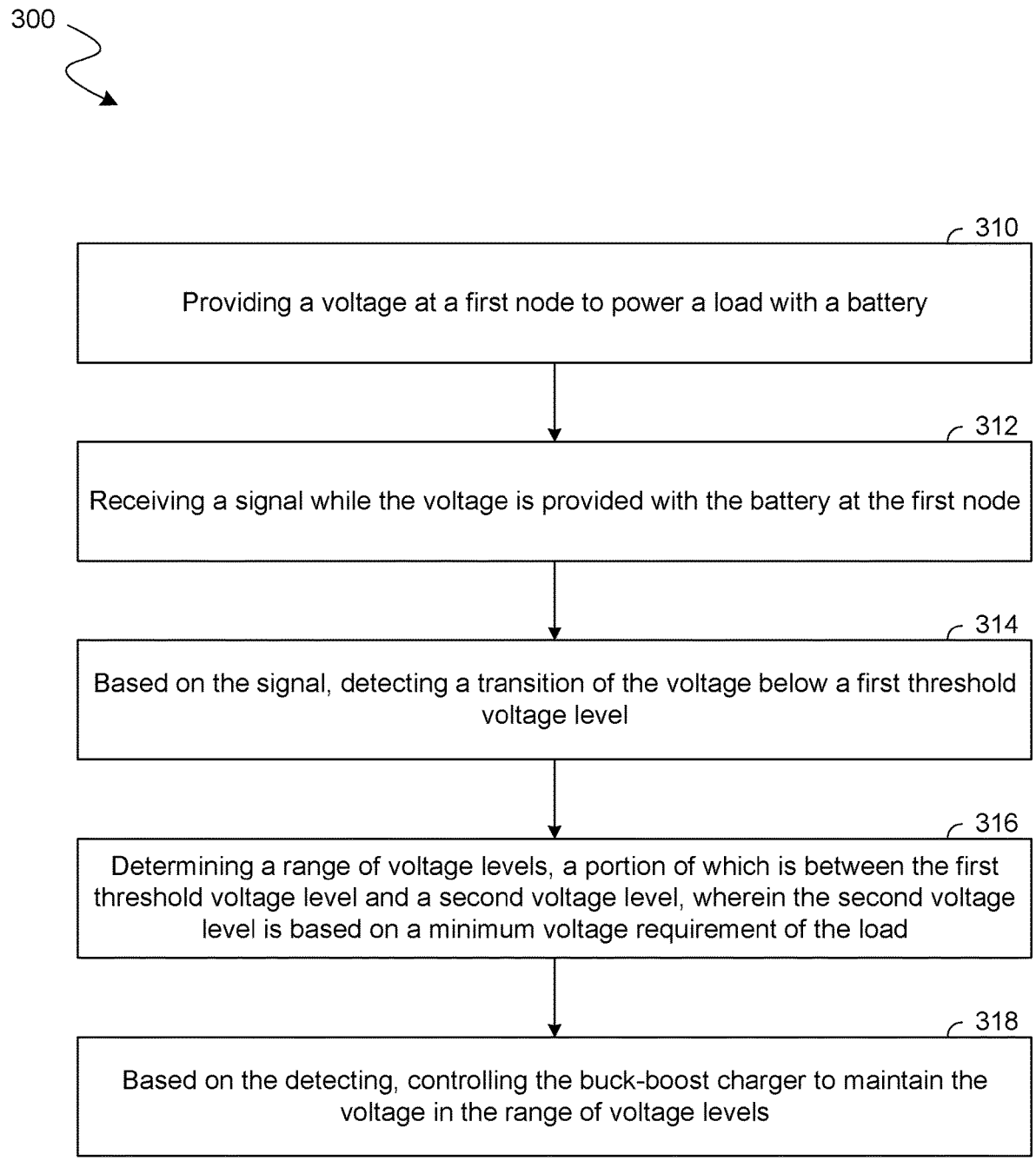
FIG. 3 illustrates a flow diagram showing elements of a method to supplement power delivery with a battery according to an embodiment.

FIG. 3 shows features of a method 300 to operate voltage regulator circuitry according to an embodiment. Method 300 is one example of an embodiment—performed with one of systems 100, 200, for example—which mitigates a risk of system shutdown due to high power demand.

In some embodiments, method 300 is performed with hardware logic and/or software logic—e.g., the logic comprising one or more of a charger, controller logic, or monitor logic—that is operable to enter any of multiple modes including, for example, two modes referred to herein as "a protection mode" and "a protection ready mode." In a protection ready mode, the charger and/or the controller logic and/or the monitor logic charges an input capacitor (for example, charges energy storage 208) when the system is in an awake mode (for example, mode S0). In one illustrative embodiment, for example, the input capacitor (energy storage) is charged to 20V when the system load is in the awake mode. Such charging prepares for a supplementing of battery power to the system load in the future.

In some embodiments, a protection mode is entered into by the charger and/or the controller logic and/or the monitor logic in response to detecting that a system voltage $V_{sys}$ has transitioned (or, according to some predefined criteria, is expected to transition) below a threshold voltage $V_{sys\_th}$. In a protection mode, the charger and/or the controller logic and/or the monitor logic supplement a battery in order to keep the system voltage $V_{sys}$ in a range of voltage levels which is above the minimum system voltage level $V_{sys\_min}$, where a portion of the range of voltage levels is between voltage levels $V_{sys\_th}$, $V_{sys\_min}$. In some embodiments, the protection mode of the charger is disabled when a CPU and/or other load circuitry is in a low power mode (for example, in mode S0i3, or any of modes S3-S5).

As shown in FIG. 3, method 300 includes (at 310) providing a voltage at a first node with a battery, the providing to power a load which is coupled to the battery via the first node. In an embodiment, a buck-boost charger is coupled between the first node and a second node, wherein the buck-boost charger is coupled both to a connector and to a capacitor via the second node. The connector facilitates coupling of the second node (and of the capacitor via the second node) to a power source. For example, the buck-boost charger, first node, second node, connector, and capacitor correspond functionally to charger 204, node 232, node 230, input port 202, and energy storage 208 (respectively). In other embodiments, method 300 omits the providing at 310, but is based on the providing of such voltage and/or is performed to regulate the providing.

Method 300 further comprise (at 312) receiving a signal while the voltage is provided with the battery at the first node—e.g., wherein monitor 240 communicates the signal to controller 220 based on the voltage provided at node 232. Based on the signal received at 312, method 300 further detects (at 314) a transition of the voltage below a first threshold voltage level ($V_{sys\_th}$). The detecting at 314 includes detecting that the voltage has actually transitioned below voltage level $V_{sys\_th}$, or—alternatively—detecting that (according to some predetermined criteria) the voltage is expected to transition below voltage level $V_{sys\_th}$. In some embodiments, method 300 further comprises detecting a change to the first threshold voltage level—e.g., where the threshold voltage level $V_{sys\_th}$ is dynamically changed by an embedded controller, a SoC or other such circuitry. In one such embodiment, the detecting at 314 is based on this detected change to voltage level $V_{sys\_th}$.

Method 300 further comprise (at 316) determining a range of voltage levels, wherein a portion of the range is between the first threshold voltage level and a second voltage level ($V_{sys\_min}$), wherein the second voltage level is based on a minimum voltage requirement of the load. Method 300 further comprise (at 318) controlling the buck-boost charger, based on the detecting at 314, to maintain the voltage in the range of voltage levels. In some embodiments, a difference between the first threshold voltage level and the second voltage level is at least 50 milliVolts—e.g., wherein the difference is at least 0.1 Volts and, in some embodiments, at least 0.3 Volts. In one such embodiment, the difference is less than 5V.

In an embodiment, the predetermined range of voltage levels is defined by a maximum voltage level (Vrmx) of the range and a minimum voltage level (Vrmn) of the range, where the minimum voltage level Vrmn is equal to or greater than the minimum system voltage level $V_{sys\_min}$, and is less than the threshold voltage level $V_{sys\_th}$. In some embodiments, most voltage levels of the range are between $V_{sys\_th}$ and $V_{sys\_min}$—e.g., where the voltage level Vrmn is equal to $V_{sys\_min}$.

In various embodiments, for example, a difference Δv1 between voltage levels $V_{sys\_th}$, Vrmn is at least 10% (e.g., at least 20% and, in some embodiments, at least 50%) of a difference Δv2 between voltage levels $V_{sys\_th}$, $V_{sys\_min}$. Additionally or alternatively, the voltage difference Δv1 is at least 5 mV (e.g., at least 10 mV and, in some embodiments, at least 25 mV), for example. In one such embodiment, a difference Δv3 between voltage levels Vrmx, Vrmn is at least 10% (e.g., at least 20% and, in some embodiments, at least 50%) of the difference Δv2 between voltage levels $V_{sys\_th}$, $V_{sys\_min}$. Additionally or alternatively, the voltage difference Δv3 is at least 5 mV, for example (e.g., where Δv3 is at least 10 mV and, in some embodiments, at least 25 mV). Additionally or alternatively, voltage level Vrmx is equal to voltage level $V_{sys\_th}$ and/or wherein voltage level Vrmn is equal to voltage level $V_{sys\_min}$, in some embodiments.

In some embodiments, the range of voltage levels spans at least some minimum portion of the difference between voltage levels $V_{sys\_th}$, $V_{sys\_min}$—e.g., wherein voltage level Vrmx is equal to $V_{sys\_th}$, and/or voltage level Vrmn is equal to $V_{sys\_min}$. In one such embodiment, a difference Δv4 between voltage levels Vrmx, $V_{sys\_min}$ is at least 30% (e.g., at least 50% and, in some embodiments, at least 70%) of a difference Δv2 between voltage levels $V_{sys\_th}$, $V_{sys\_min}$. Additionally or alternatively, the voltage difference Δv4 is at least 15 mV, for example (e.g., where Δv4 is at least 25 mV and, in some embodiments, at least 35 mV). In one such embodiment, the voltage level Vrmx is equal to threshold voltage level $V_{sys\_th}$, and the voltage level Vrmn is equal to the minimum system voltage level $V_{sys\_min}$.

In some embodiments, the range of voltage levels spans only a sub-portion of the total range voltage levels $V_{sys\_th}$, $V_{sys\_min}$. In one such embodiment, a difference Δv5 between voltage levels $V_{sys\_th}$, Vrmx is at least 10% (e.g., at least 20% and, in some embodiments, at least 50%) of a difference Δv2 between voltage levels $V_{sys\_th}$, $V_{sys\_min}$. Additionally or alternatively, the voltage difference Δv5 is at least 5 mV (e.g., at least 10 mV and, in some embodiments, at least 25 mV), in some embodiments.

In various embodiments, a difference Δv4 between voltage levels Vrmx, $V_{sys\_min}$ is less than 20% (e.g., less than 10% and, in some embodiments, less than 5%) of a difference Δv2 between voltage levels $V_{sys\_th}$, $V_{sys\_min}$. Additionally or alternatively, the voltage difference Δv4 is less than 10 mV (e.g., less than 5 mV and, in some embodiments, less than 2.5 mV), in some embodiments. Additionally or alternatively, the voltage level Vrmn is equal to the minimum system voltage level $V_{sys\_min}$.

In some embodiments, method 300 further comprises one or more additional operations (not shown) which, for example, control circuitry of the load and/or transition logic which performs method 300 from a protection mode to a protection ready mode. For example, in one embodiment, method 300 further comprises receiving a second signal indicating that another voltage at the second node has transitioned below a second threshold voltage level ($V_{adp\_th}$). Based on the second signal, controller logic (such as that of controller 220) generates a control signal to throttle a frequency or other operational characteristic of a processor that is powered with the voltage at the first node. Additionally or alternatively, method 300 further comprises receiving a third signal which indicates that a power consumption of the load is above a threshold power level. Based on the third signal, controller logic (such as that of controller 220) operates the buck-bust charger to enable the voltage to be above the first threshold voltage level.

Figure 4:
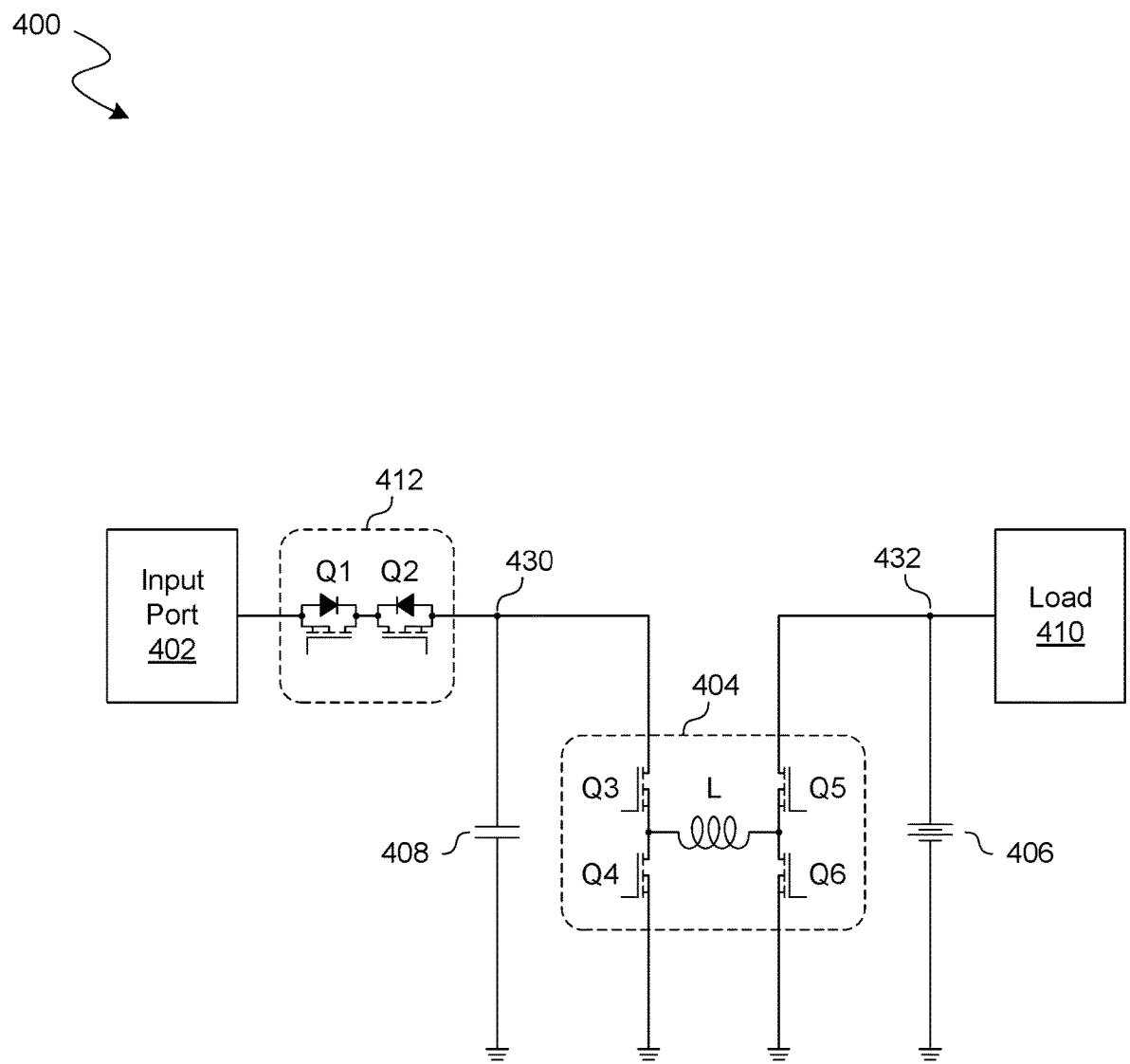
FIGS. 4 and 5 illustrate respective hybrid circuit and functional block diagrams each showing elements of a system to regulate power delivery according to a corresponding embodiment.

FIG. 4 shows features of a system 400 to provide power to a system load according to an embodiment. System 400 is one example of an embodiment wherein a buck-boost charger is coupled to facilitate a maintenance of a system voltage between a threshold voltage level and a minimum voltage level that a load is able to accommodate. In various embodiments, system 400 includes some or all the features of one of systems 100, 200—e.g., where operations of method 300 are performed with system 400.

As shown in FIG. 4, system 400 comprises an input port 402, a buck-boost charger 404, a battery 406, an energy storage 408, and a switch 412 that—for example—correspond functionally to input port 202, charger 204, battery 206, energy storage 208, and switch 212 (respectively). In some embodiments, system 400 further comprises (or alternatively, is to couple to) a system load 410 that, for example, corresponds functionally to system load 210.

Battery 406 is coupled to provide power to system load 410 via a node 432—e.g., in the absence of any power source being coupled to provide power via input port 202. In some embodiments, charger 404 is operable to additionally or alternatively provide power to system load 410 via a node 432, and/or is operable to charge battery 406 via node 432—e.g., where such charging is performed with energy storage 408 and/or when a power source is connected at input port 402. For example, charger 404 is operable to switchedly decouple nodes 430, 432 from each other.

In the example embodiment shown, switch 412 comprises one or more pass field effect transistors and/power FETs (e.g., including the illustrative transistors Q1, Q2 shown). Furthermore, charger 404 comprises four power field effect transistors Q3, Q4, Q5, and Q6 (such as pass FETs or power FETs) and an inductor L. In some embodiments, although the FETs Q3 through Q6 within charger 404 are illustrated differently than FETs Q1, Q2 of switch 412, it is noted that in some embodiments, all FETs illustrated in FIG. 4 are the same. That is, in some embodiments all FETs in FIG. 4 are as those illustrated as FETs Q1 and Q2, and in some embodiments, all FETs in FIG. 4 are as those illustrated as FETs Q3 through Q6 are illustrated.

In some embodiments, system 400 accommodates coupling to—or alternatively, further includes—hardware logic and/or software logic (not shown) to provide functionality such as that of monitor 240 and/or controller 220. For example, such controller logic provides functionality to detect a voltage at node 232 (and, for example, to operate various ones of transistors Q3 through Q6 based on said voltage). In one such embodiment, the controller logic further provides functionality to detect that a power source is coupled to system 200 via input port 202 (and, for example, to operate one or both of transistors Q1, Q2 based on said detecting). Alternatively or in addition, such controller logic further provides functionality to detect a voltage at node 430.

Responsive to such controller logic, system 400 is operable to provide power to system load 210 with charger 204—e.g., wherein said power is provided from a power source via input port 202 and/or with a charge at energy storage 208. Alternatively or in addition, responsive to such controller logic, system 400 is operable to at least partially recharge battery 206 with charger 204—e.g., with a charge at energy storage 208 and/or with a charge received from a power source via input port 202. Alternatively or in addition, responsive to such controller logic, system 400 is operable to provide a charge to energy storage 208—e.g., with charge from battery 206 and/or with charge from a power source that is to be coupled via input port 202.

In one such embodiment, the controller logic performs operations (e.g., including some or all of method 300) to detect an actual or expected transition of a voltage at node 432 past a threshold voltage level $V_{sys\_th}$. In response to such detection, the controller logic selectively configures switch circuitry of charger 404 to maintain the voltage at node 432 in a predetermined range of voltage levels (as described, for example, with reference to method 300). For example, the controller logic provides signaling to one or more of FETs Q3 through Q6—e.g., to selectively enable a conductive path between nodes 430, 432 via FETs Q3, Q6 and inductor L. In some embodiments, some or all FETs of charger 404 are variously configured over a period of time to actively regulate the voltage at node 432—e.g., until a level of power usage by load 410 transitions below a predefined threshold power level.

Figure 5:
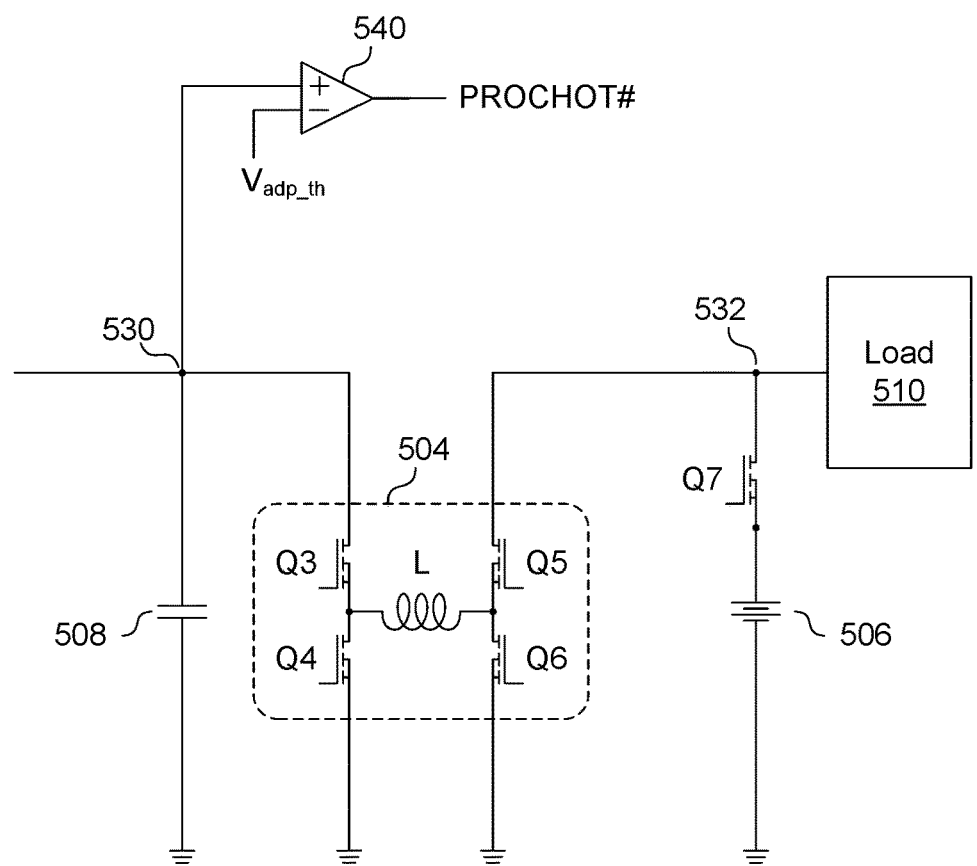

FIG. 5 shows features of a system 500 to regulate a system voltage according to an embodiment. System 500 is one example of an embodiment which facilitates throttling of an operation by a load circuit, where the throttling is based on an indication that at least some currently implemented voltage regulation is expected to be insufficient for an existing power demand. In various embodiments, system 500 includes some or all the features of one of systems 100, 200, 400—e.g., where operations of method 300 are performed with system 500.

As shown in FIG. 5, system 500 comprises a buck-boost charger 504, a battery 506, and an energy storage 508 that—for example—correspond functionally to charger 404, battery 406, and energy storage 408 (respectively). In some embodiments, system 500 further comprises, or is to couple to, a load 510 that, for example, corresponds functionally to load 410. In the example embodiment shown, charger 504 comprises four power field effect transistors Q3, Q4, Q5, and Q6 (such as pass FETs or power FETs) and an inductor L. Although some embodiments are not limited in this regard, system 500 further comprises other switch circuitry (such as the illustrative FET Q7 shown) which is operable to switchedly decouple battery 506 and node 532 from each other—e.g., when an alternative source is to provide power to load 510.

Similar to certain features of systems 200, 400, battery 506 is operable to provide a voltage to a node 532, the voltage to power load 510. Charger 504 is coupled between node 532 and another node 530, wherein energy storage 508 is coupled to charger 504 via node 530. Some embodiments variously provide controller logic (not shown) which is configured to operate charger 504 to supplement power delivery with battery 506 in response to an indication that the voltage at node 532 has transitioned (or is expected to transition) below a predefined threshold voltage level $V_{sys\_th}$. For example, such controller logic provides functionality to detect the voltage at node 532 and to selectively operate various ones of transistors Q3 through Q6 based on said voltage. In an embodiment, such operation of charger 504 maintains the voltage at node 532 in a predetermined range of voltage levels (as described, for example, with reference to method 300).

In some embodiments, system 500 further comprises a circuit to evaluate whether (according to some predefined criteria) the supplementing of battery 506 is at risk of being insufficient for an existing or expected power requirement of load 510. Based on such an evaluation, the circuit generates one or more control signals to throttle or otherwise change an operational state of one or more load circuits—e.g., by throttling a frequency of a processor.

By way of illustration and not limitation, system 500 further comprises a comparator 540 which is coupled to compare a second voltage at node 530 to another threshold voltage level $V_{adp\_th}$ that, for example, is greater than 0V. In response to detecting that the voltage at node 530 is less than voltage level $V_{adp\_th}$, comparator 540 transitions a logic state of a digital signal PROCHOT# which (for example) is communicated via another path to a processor, SOC or other circuitry of load 510. In response to such a transition of the PROCHOT# control signal, an operational state of the circuitry changes to decrease a power demand by load 510. PROCHOT# is one example of a control signal used to throttle an operational characteristic such as a clock frequency of a processor.

Figure 6:
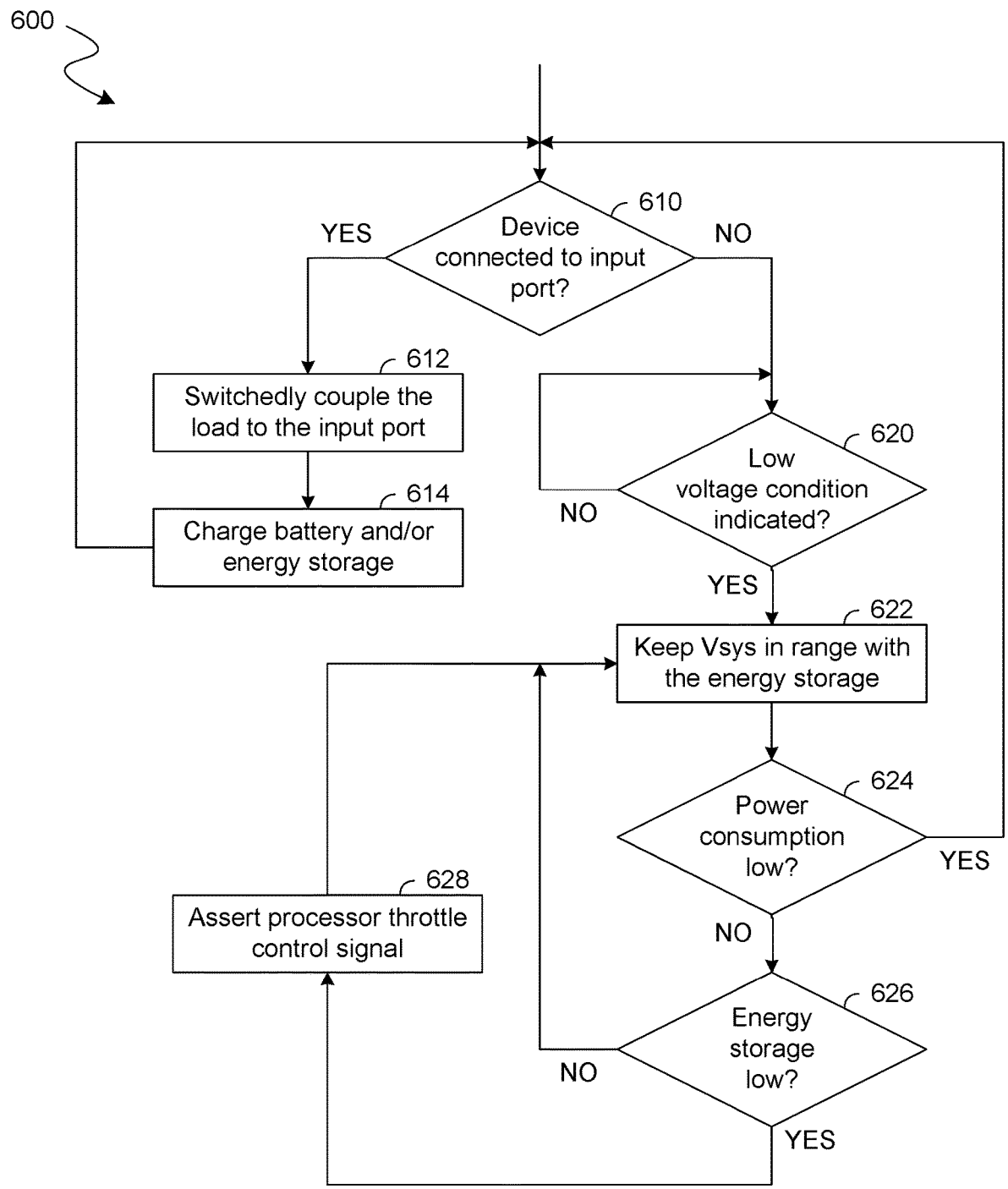
FIG. 6 is a flow diagram illustrating elements of a method to regulate charging of a battery according to an embodiment.

FIG. 6 shows features of a method 600 to operate voltage regulator circuitry according to an embodiment. In various embodiments, method 600 includes features of method 300—e.g., where some or all of method 600 is performed with one of systems 200, 400, 500.

Method 600 comprises (at 610) evaluating whether a device is connected to an input port (e.g., one of input ports 202, 402)—e.g., where the device provides a power source for either or both of a battery or an energy storage. The battery and the energy storage are coupled to one another via a charger (e.g., one of chargers 204, 404, 504) that, in some embodiments, supports buck-boost functionality to selectively supplement a power delivery by the battery using a charge at the energy storage.

Where it is determined at 610 that such a device is connected to the input port, method 600 (at 612) operates the charger to switchedly couple the load to the input port. Additionally or alternatively, (at 614) method 600 charges, at least in part, one or both of the battery and the energy storage using power from the device, and then repeats the evaluating at 610.

However, where it is instead determined at 610 that no such device is connected to the input port, method 600 (at 620) evaluates whether a low voltage condition is indicated at a first node—e.g., one of nodes 232, 432, 532—by which power is being delivered to a load circuit with the battery. In an embodiment, the evaluating at 620 includes detecting whether—due to increased power demand by the system load, for example—a voltage $V_{sys}$ at the first node has transitioned (or is expected to transition) below a threshold voltage level $V_{sys\_th}$.

Where it is determined at 620 that no such low voltage condition is indicated, method 600 repeats the evaluating at 620. However, where the low voltage condition is indicated at 620, method 600 operates the charger circuit (at 622) to keep the voltage $V_{sys}$ within a range of voltage levels using the energy storage. As described elsewhere herein, at least a portion of the range of voltage levels is less than the threshold voltage level $V_{sys\_th}$—e.g., where each voltage level in the range of voltage levels is equal to or greater than a minimum voltage level $V_{sys\_min}$ that the system load can accommodate.

Method 600 further comprises evaluating (at 624) whether power consumption by the load circuit has decreased to some threshold power level. Where it is determined at 624 that such power consumption has decreased sufficiently, method 600 returns to the evaluating at 610—e.g., where method 600 operates the charger to allow an increase of voltage $V_{sys}$ above the range of voltage levels. However, where it is instead determined at 624 that the load's power consumption has not decreased sufficiently, method 600 evaluates (at 626) whether the energy storage is in a low charge storage state. In an embodiment, the evaluating at 626 comprises determining whether another voltage $V_{adp}$ at a second node (e.g., one of nodes 230, 430, 530) has transitioned to, or is expected to transition to, another threshold voltage level $V_{adp\_th}$ which is greater than 0V.

Where it is determined at 626 that the energy storage is sufficiently charged (according to some predetermined criteria), method 600 continues the regulation of voltage $V_{sys}$ at 622. However, where it is instead determined at 626 that the charge at the energy storage is low, method 600 (at 628) asserts a control signal to throttle a processor—or other circuitry—of the load, and continues the regulation of voltage $V_{sys}$ at 622.

Figure 7:
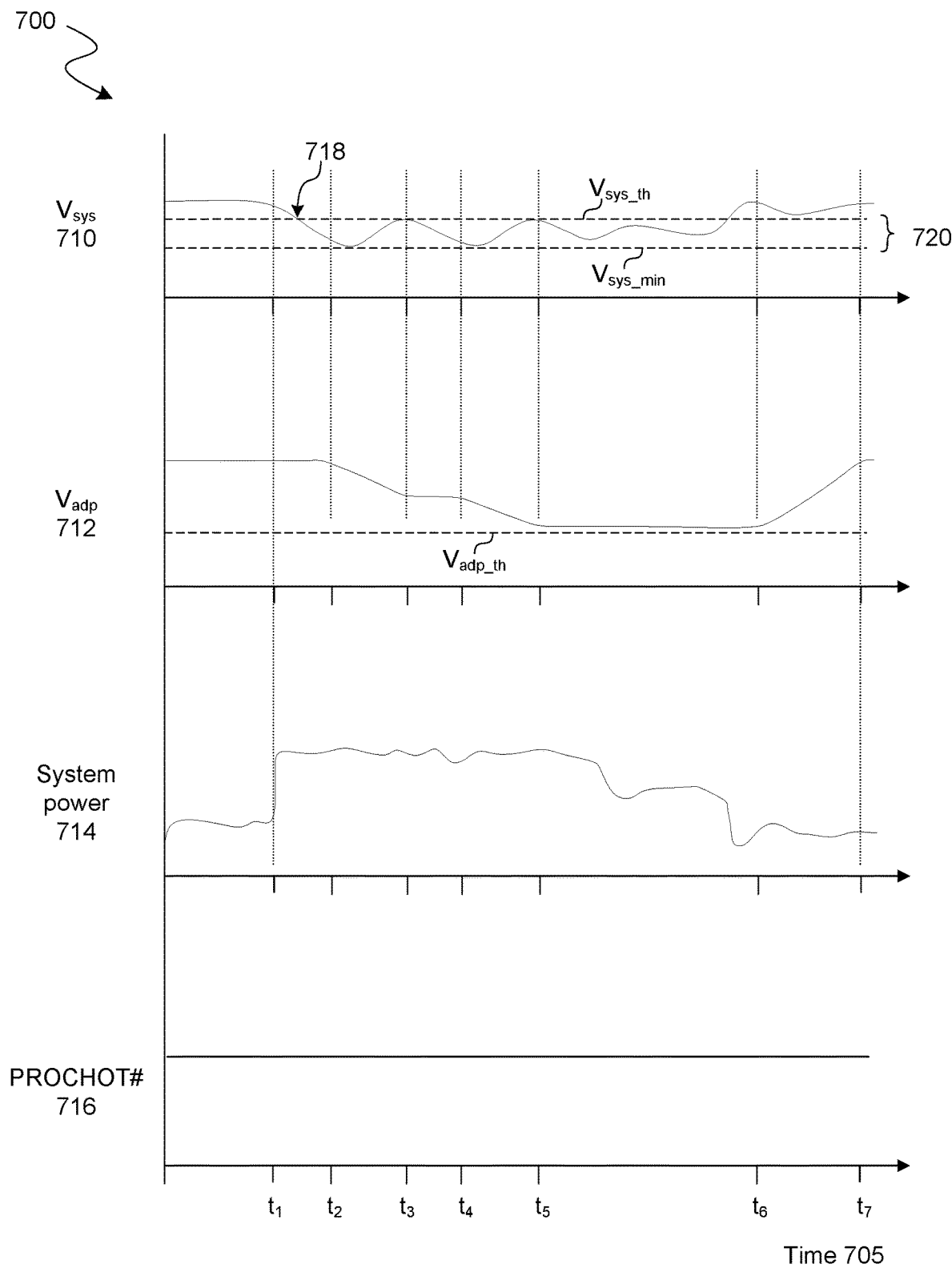
FIGS. 7 and 8 illustrate a respective timing diagram each showing signals communicated to facilitate power delivery according to a corresponding embodiment.

FIG. 7 shows a timing diagram 700 illustrating signals variously provided with voltage regulation circuitry according to an embodiment. Timing diagram 700 illustrates a voltage, for powering a load circuit, being regulated in response to a transition of the voltage below a threshold voltage level, where the regulation maintains the voltage in a predetermined range of voltage levels. The voltage levels of the range are each at or above a minimum voltage level required by the load, and at least a portion of the range is below the threshold voltage level. Such voltage regulation is provided (for example) according to one of methods 300, 600 and/or with circuitry such as that in one of systems 200, 400, 500.

As shown in FIG. 7, timing diagram 700 shows various respective characteristics of signals over a period of time 705. For example, timing diagram 700 shows a voltage $V_{sys}$ 710 that is provided to a load via a first node such as one of nodes 232, 432, 532. Timing diagram 700 also shows another voltage $V_{adp}$ 712 that is provided with an energy storage at a second node (such as one of nodes 230, 430, 530) which is coupled to the first node via a buck-boost charger—e.g., one of chargers 204, 404, 504. Timing diagram 700 further shows a varying level of system power 714 that is used by the load, and a control signal PROCHOT# that is used to throttle operation of a processor and/or other circuitry of the load.

In timing diagram 700, a spike in system power 714 at a time $t_1$ (e.g., the spike due to a turbo mode of processor operation) contributes to a decrease in voltage $V_{sys}$ 710, as a battery which provides the $V_{sys}$ 710—e.g., one of batteries 206, 406, 506—begins to lose a sufficient level of charge. Soon after, this results in a transition 718 of voltage $V_{sys}$ 710 below a predefined threshold voltage level $V_{sys\_th}$.

In response to the transition 718, controller circuitry according to an embodiment transitions to a protection mode, whereby the charger is operated to supplement the battery (with charge from the energy storage, for example) in delivering power to the load. In some embodiments, the protection mode maintains voltage $V_{sys}$ 710 in a predetermined range 720 of voltage levels which are each at or above a minimum voltage level $V_{sys\_min}$ required by the load, where at least a portion of range 720 is below voltage level $V_{sys\_th}$. In the example embodiment shown, the range 720 occupies substantially all of the range between voltage level $V_{sys\_min}$ and voltage level $V_{sys\_th}$—e.g., wherein a minimum voltage level of range 720 is equal to voltage level $V_{sys\_min}$, and wherein a maximum voltage level of range 720 is equal to voltage level $V_{sys\_th}$.

Active regulation of voltage $V_{sys}$ 710 within range 720 comprises variously operating switch circuitry of the charger, at different times, to selectively enable or disable a conductive path between the first node and the second node. Such operating facilitates a buck-boost functionality which selectively charges or otherwise supplements the battery using charge from the energy storage. In an illustrative scenario according to one embodiment, regulation of voltage $V_{sys}$ 710 within range 720 comprises enable a conductive path between the first and second nodes during a period of time between times $t_2$, $t_3$ (and also during a period of time between times $t_4$, $t_5$). Furthermore, such regulation of voltage $V_{sys}$ 710 comprises disabling such a conductive path between times $t_3$, $t_4$ (and also between times $t_5$, $t_6$).

Such operation of the charger causes voltage $V_{adp}$ 712 to decease during a period of time between times $t_2$, $t_3$ (and also during the period of time between times $t_4$, $t_5$) as charge migrates from the energy storage toward the first node via the charger. Due to the regulation of voltage $V_{sys}$ 710 within a relatively low voltage range 720, some embodiments (as compared to existing techniques) allow load circuitry—e.g., a processor—to operate in a high power state for a longer period of time. For example, in timing diagram 700, the control signal PROCHOT#716 is not asserted in response to transition 718. In one such embodiment, PROCHOT#716 would be asserted if voltage $V_{adp}$ 712 were to transition below some predefined threshold voltage level $V_{adp\_th}$ that (for example) is greater than 0V.

Figure 8:
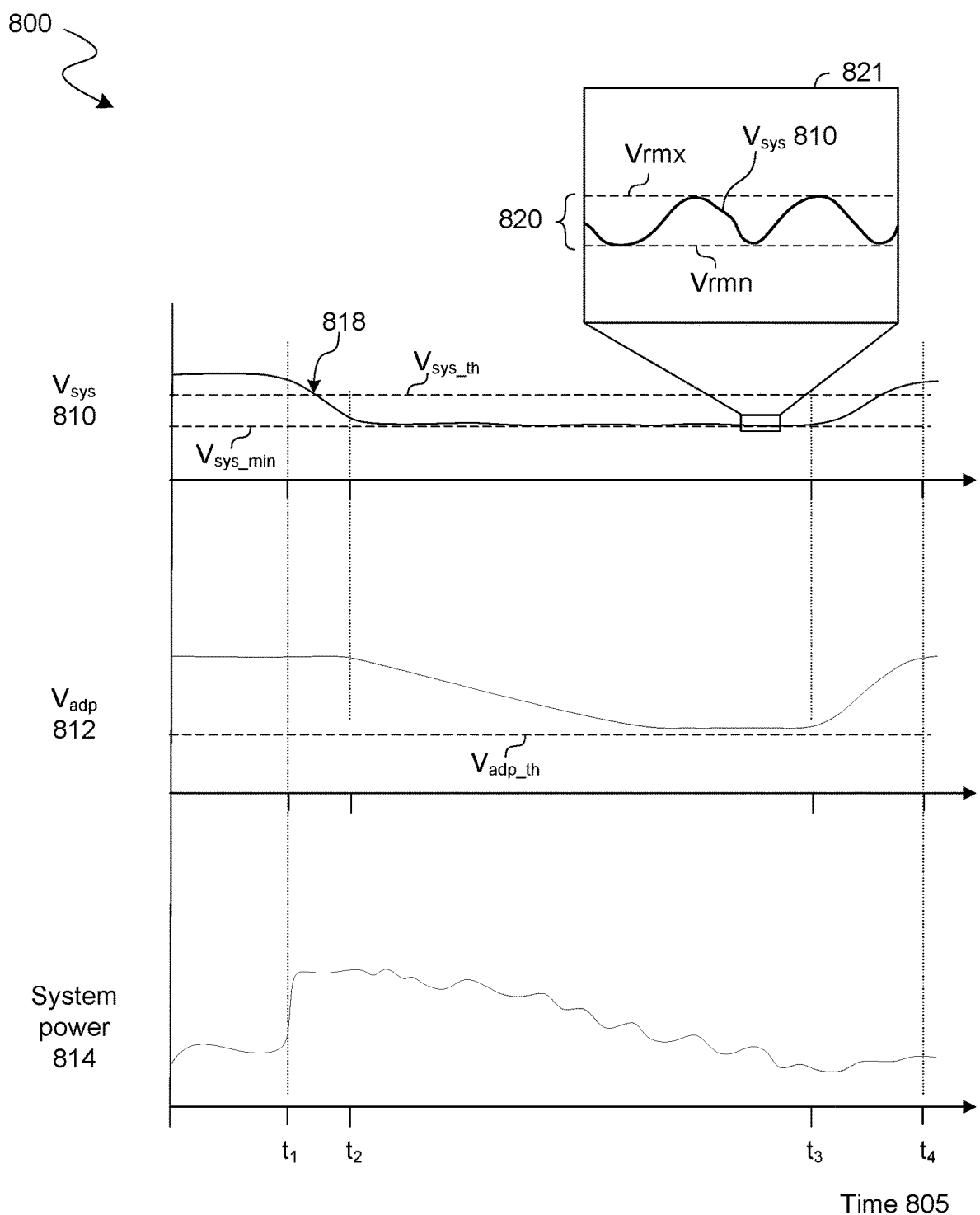

FIG. 8 shows a timing diagram 800 illustrating signals variously provided with voltage regulation circuitry according to another embodiment. Voltage regulation such as that shown in timing diagram 800 is provided (for example) according to one of methods 300, 600 and/or with circuitry in one of systems 200, 400, 500.

As shown in FIG. 8, timing diagram 800 shows characteristics of signals over a period of time 805. For example, timing diagram 800 shows a voltage $V_{sys}$ 810 provided to a load via a first node (e.g., one of nodes 232, 432, 532), another voltage $V_{adp}$ 812 that is provided with an energy storage at a second node (such as one of nodes 230, 430, 530) which is coupled to the first node via a buck-boost charger, and a system power 814 that is used by the load.

In timing diagram 800, a spike in system power 814 at a time $t_1$ contributes to a transition 818 of voltage $V_{sys}$ 810 below a predefined threshold voltage level $V_{sys\_th}$. In response to the transition 818, controller circuitry according to an embodiment transitions to a protection mode, whereby the charger is operated to maintain voltage $V_{sys}$ 810 in a predetermined range 820 of voltage levels which are each at or above a minimum voltage level $V_{sys\_min}$ required by the load. At least a portion of range 820 is below voltage level $V_{sys\_th}$. In the example embodiment shown, some or all of range 820 is closer to voltage level $V_{sys\_min}$ than to voltage level $V_{sys\_th}$. For example, as shown in detail view 821, range 820 is defined by a maximum voltage level Vrmx, and a minimum voltage level Vrmn, wherein a difference (Vrmx−Vrmn) is less than 30% (e.g., less than 20% and, in some embodiments, less than 10%) of a difference $(V_{sys\_th}-V_{sys\_min})$. Additionally or alternatively, a difference $(Vrmx-V_{sys\_min})$ is less than 30% of a difference $(V_{sys\_th}-V_{sys\_min})$—e.g., where voltage level Vrmn is equal to voltage level $V_{sys\_min}$.

In some embodiments, regulation of voltage $V_{sys}$ 810 within range 820 continues until system power 814 falls below some threshold level of power usage. Alternatively or in addition, the generation of one or more control signals depends upon whether voltage $V_{adp}$ 812 transitions below some threshold voltage level $V_{adp\_th}$ that (for example) is greater than 0V.

Figure 9:
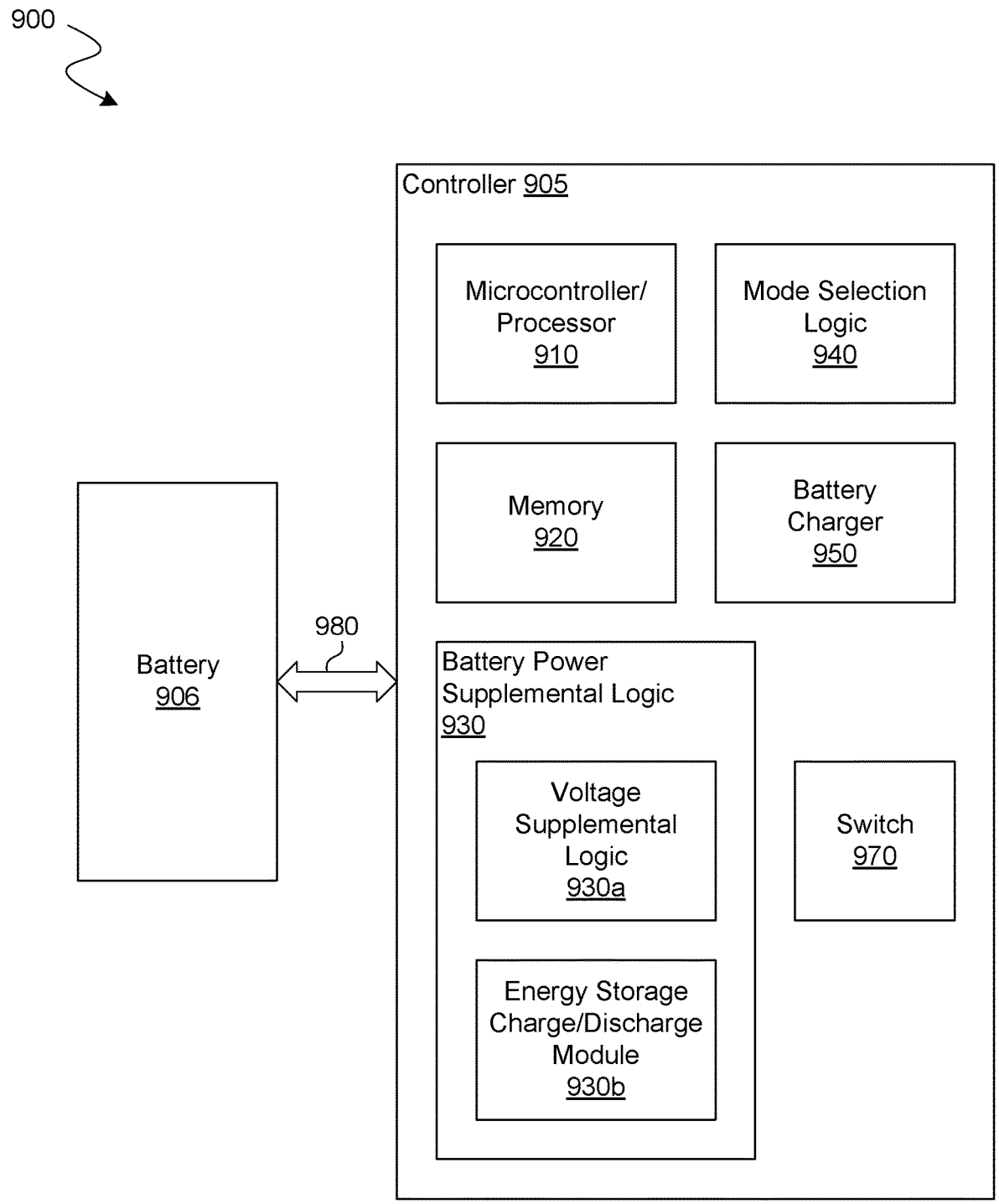
FIG. 9 illustrates a functional block diagram showing elements of a system to regulate power delivery according to an embodiment.

FIG. 9 shows features of a system 900 to charge a battery according to an embodiment. In various embodiments, system 900 includes features of one of systems 100, 200, 400, 500—e.g., where functionality of system 900 is provided to perform some or all of one of methods 300, 600.

As shown in FIG. 9, system 900 includes a controller 905 that controls a delivery of power with a battery and/or a power source (not shown) which is to couple to system 900. In some embodiments, controller 905 is one or more of an application specific integrated circuit (ASIC), a digital signal processor (DSP), a field programmable gate array (FPGA), a processor, etc. including some of all of the functional blocks in FIG. 9. In some embodiments, all or part of controller 905 is implemented in software as stored on a memory and executed by, for example, a processor or microcontroller. In some embodiments, controller 905 is, for example, a control IC. In some embodiments, controller 905 is part of a power management integrated circuit (PMIC). In some embodiments, controller 905 is part of a battery management system.

Controller 905 interfaces with battery 906 using an interface 980. Interface 980 includes a physical interface for supplying power and ground. In some embodiments, interface 980 includes a data interface. In some embodiments, controller 905 includes a processor or microcontroller 910, a memory 920, and battery power supplemental logic 930. In some embodiments, battery power supplemental logic 930 determines whether the power provided by the battery of the power supply system is to be supplemented or not from energy storage. In some embodiments, battery power supplemental logic 930 includes voltage supplemental module 930a that determines whether to supplement the power provided by the battery based on, for example, the voltage currently being provided to the system load. This is based on voltage monitoring hardware that provides voltage measurements to voltage supplemental module 930a. In some embodiments, if the voltage transitions below a threshold, or other predetermined level, yet is above the voltage minimum of the system, then voltage supplemental module 930a triggers and controls the power supply system to regulate said voltage to be within a range of voltage levels, a portion of which is below the threshold and above the voltage minimum. For example, this control includes turning on/off switches in the power delivery system (for example, switches 970, which includes any one or more switches of one of systems 200, 400, 500, for example) to enable power to flow to the system load or to energy storage, and/or to protect other components in the system, to decouple the system load from the battery, etc.

In some embodiments, battery power supplemental logic 930 includes an energy storage charge and discharge module 930b that controls components in a buck-boost charging system such as, for example, one of system 200, 400, and/or 500 to cause the energy storage to be charged at times and to be discharged and/or disabled at other times.

Controller 905 also includes mode selection logic 940 that determines when to enter a particular mode, such as, for example, protection mode and protection ready mode as described herein. In some embodiments, mode selection logic 940 triggers entry into the protection mode when the system voltage level transitions below a predetermined threshold level. In some embodiments, mode selection logic 940 triggers entry into protection ready mode to cause controller 905 to signal the battery charger to charge energy storage to prepare the power supply system for potential entry into protection mode in the future.

While not shown in FIG. 9, controller 905 further comprises analog-to-digital converters (ADCs), filters, and a digital amplifier, in some embodiments. One or more of the ADCs, filters, and digital amplifier is, for example, an ASIC, a DSP, an FPGA, a processor, etc. These elements are used to convert and analog measurement (for example, battery current and voltage) to a digital value for use in the battery charging control process. The digital amplifier is, for example, a differential amplifier that generates an analog signal based on the voltage drop across the battery (for example, the difference in voltage values between the positive and negative terminal of the battery), which is then converted to a filtered digital value using the ADC and the filter.

In some embodiments, controller 905 includes a battery charger 950 to charge the battery using current charge from energy storage charge and discharge module 930b and/or from a power supply.

In some embodiments, the threshold voltage level $V_{sys\_th}$ of the system voltage $V_{sys\_th}$ is dynamically changed (e.g., adjusted or otherwise updated) by the system Embedded Controller, or the SoC. Such a change to the threshold voltage level $V_{sys\_th}$ is made, for example, based on the battery state of charge, peak power projections of the SoC or the rest of the platform, system impedance, or changes in system input decoupling, minimum system voltage, etc. In some embodiments, controller 905 implements any of the switch control or any other control described herein. For example, in some embodiments, controller 905 implements operations of one of methods 300, 600.

Figure 10:
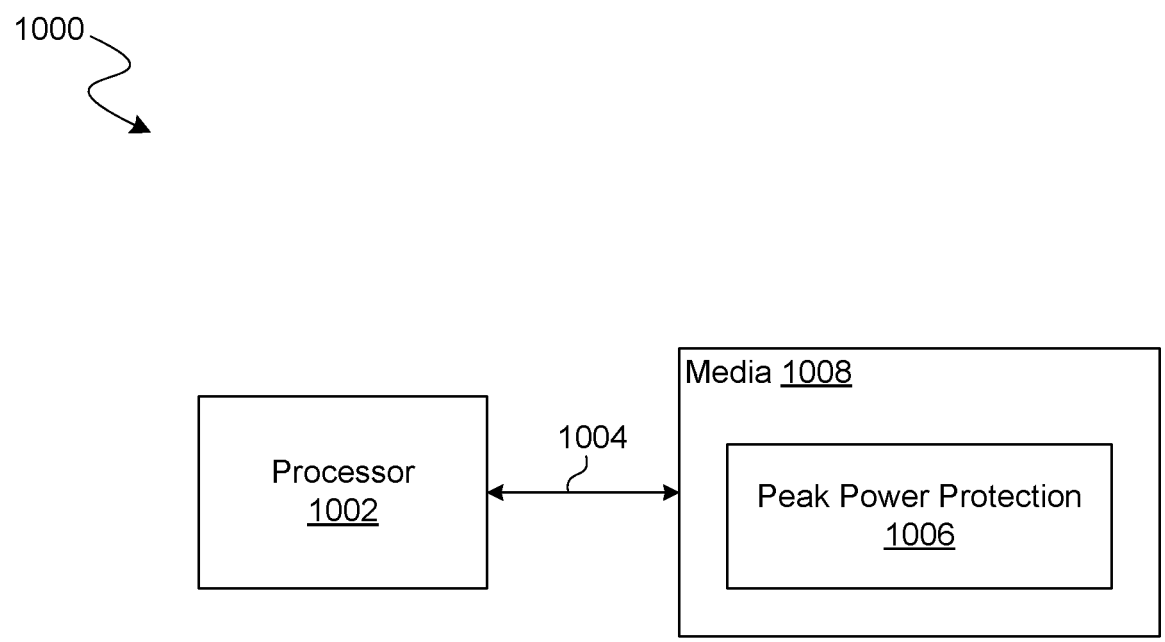
FIG. 10 illustrates a functional block diagram showing elements of a system to control battery charger circuitry according to an embodiment.

FIG. 10 shows features of a system 1000 to provide power to a system load according to an embodiment. System 1000 is one example of an embodiment which provides functionality to execute instructions to perform voltage regulation with a buck-boost charger. In various embodiments, system 1000 includes features of one of systems 100, 200, 400, 500, 900—e.g., where functionality of system 1000 performs some or all of one of methods 300, 600.

As shown in FIG. 10, system 1000 includes one or more processors 1002 and one or more tangible, non-transitory computer readable media 1008 coupled thereto. The one or more tangible, non-transitory, computer-readable media 1008 is accessed by the processor(s) 1002 over a computer interconnect 1004. Furthermore, the one or more tangible, non-transitory, computer-readable media 1008 include code to direct the processor(s) 1002 to perform operations as described herein. In some embodiments, processor 1002 is one or more processors. In some embodiments, processor(s) 1002 performs some or all of the same or similar functions that are performed by other elements described herein using instructions (code) included on media 1008 (for example, some or all of the functions illustrated in or described in reference to any of FIGS. 1-6). In some embodiments, one or more of processor(s) 1002 include the same or similar features or functionality as, for example, various controllers in this disclosure (for example, controller 220).

Various components discussed in this specification are implemented using software components. These software components are stored on the one or more tangible, non-transitory, computer-readable media 1008, as indicated in FIG. 10. For example, buck-boost, power management, peak power management, under-voltage protection, power generation, voltage generation, power protection, or voltage protection, etc. are adapted to provide a basis for processor(s) 1002 to perform one or more of any of the operations described in this specification and/or in reference to the drawings. For example, in some embodiments, one or more media 1008 include(s) peak power protection 1006 (for example, buck-boost peak power protection).

It is to be understood that any suitable number of software components are included within the one or more tangible, non-transitory computer-readable media 1008. Furthermore, any number of additional software components shown or not shown in FIG. 10 are included within the one or more tangible, non-transitory, computer-readable media 1008, depending on the specific application.

Figure 11:
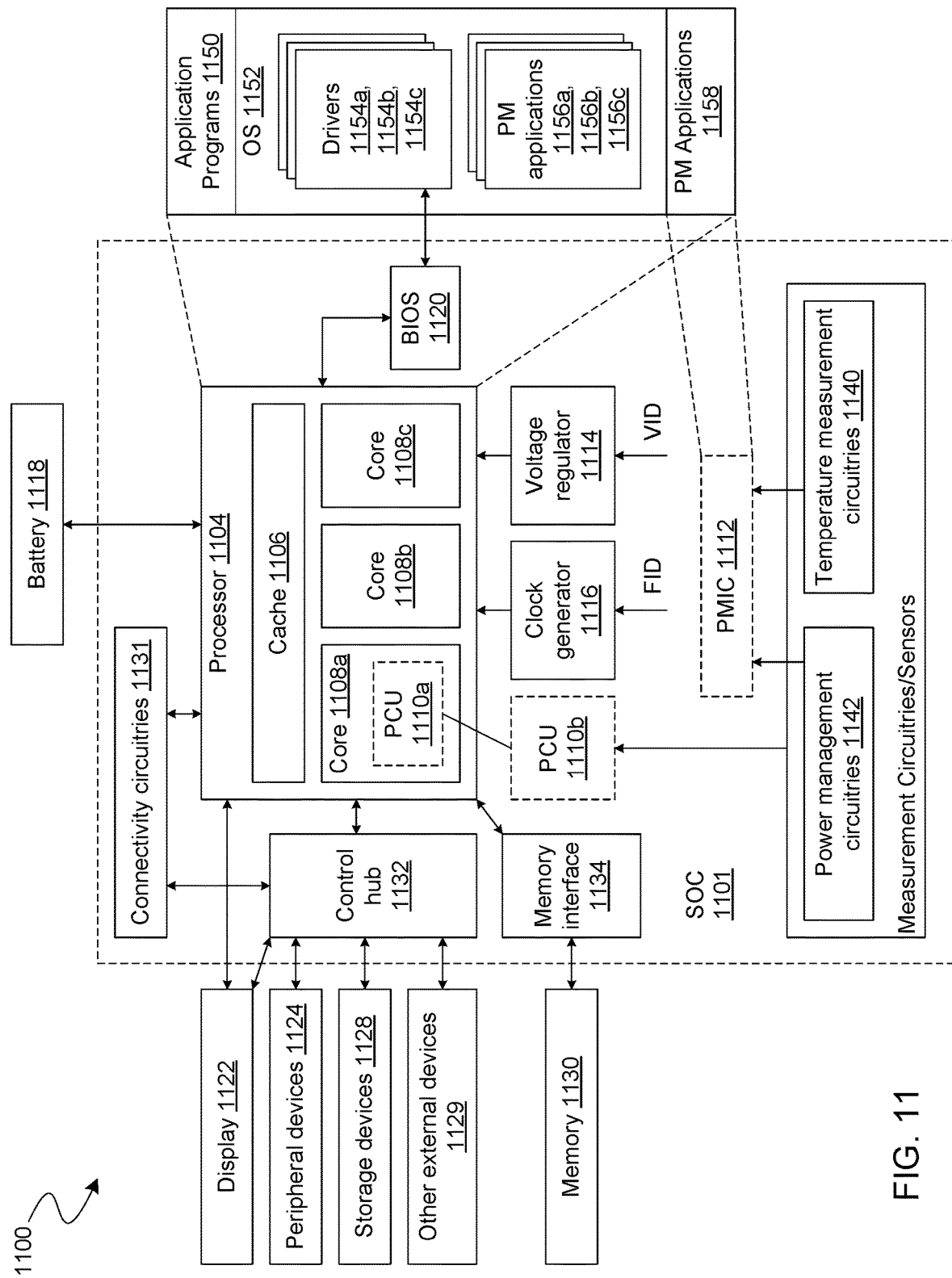
FIG. 11 is a functional block diagram illustrating a computing device in accordance with one embodiment.

FIG. 11 illustrates a computer system or computing device 1100 (also referred to as device 1100) to provide active voltage minimum (Vmin) active protection, in accordance with some embodiments. It is pointed out that those elements of FIG. 11 having the same reference numbers (or names) as the elements of any other figure can operate or function in any manner similar to that described, but are not limited to such.

In some embodiments, device 1100 represents an appropriate computing device, such as a computing tablet, a mobile phone or smart-phone, a laptop, a desktop, an Internet-of-Things (JOT) device, a server, a wearable device, a set-top box, a wireless-enabled e-reader, or the like. It will be understood that certain components are shown generally, and not all components of such a device are shown in device 1100.

In an example, the device 1100 comprises a SoC (System-on-Chip) 1101. An example boundary of the SOC 1101 is illustrated using dotted lines in FIG. 11, with some example components being illustrated to be included within SOC 1101—however, SOC 1101 may include any appropriate components of device 1100.

In some embodiments, device 1100 includes processor 1104. Processor 2110 can include one or more physical devices, such as microprocessors, application processors, microcontrollers, programmable logic devices, processing cores, or other processing means. The processing operations performed by processor 1104 include the execution of an operating platform or operating system on which applications and/or device functions are executed. The processing operations include operations related to I/O (input/output) with a human user or with other devices, operations related to power management, operations related to connecting computing device 1100 to another device, and/or the like. The processing operations may also include operations related to audio I/O and/or display I/O.

In some embodiments, processor 1104 includes multiple processing cores (also referred to as cores) 1108a, 1108b, 1108c. Although merely three cores 1108a, 1108b, 1108c are illustrated in FIG. 11, the processor 1104 may include any other appropriate number of processing cores, e.g., tens, or even hundreds of processing cores. Processor cores 1108a, 1108b, 1108c may be implemented on a single integrated circuit (IC) chip. Moreover, the chip may include one or more shared and/or private caches, buses or interconnections, graphics and/or memory controllers, or other components.

In some embodiments, processor 1104 includes cache 1106. In an example, sections of cache 1106 may be dedicated to individual cores 1108 (e.g., a first section of cache 1106 dedicated to core 1108a, a second section of cache 1106 dedicated to core 1108b, and so on). In an example, one or more sections of cache 1106 may be shared among two or more of cores 1108. Cache 1106 may be split in different levels, e.g., level 1 (L1) cache, level 2 (L2) cache, level 3 (L3) cache, etc.

In some embodiments, processor core 1104 may include a fetch unit to fetch instructions (including instructions with conditional branches) for execution by the core 1104. The instructions may be fetched from any storage devices such as the memory 1130. Processor core 1104 may also include a decode unit to decode the fetched instruction. For example, the decode unit may decode the fetched instruction into a plurality of micro-operations. Processor core 1104 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 1104 may be an out-of-order processor core in one embodiment. Processor core 1104 may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 1104 may also include a bus unit to enable communication between components of the processor core 1104 and other components via one or more buses. Processor core 1104 may also include one or more registers to store data accessed by various components of the core 1104 (such as values related to assigned app priorities and/or sub-system states (modes) association.

In some embodiments, device 1100 comprises connectivity circuitries 1131. For example, connectivity circuitries 1131 includes hardware devices (e.g., wireless and/or wired connectors and communication hardware) and/or software components (e.g., drivers, protocol stacks), e.g., to enable device 1100 to communicate with external devices. Device 1100 may be separate from the external devices, such as other computing devices, wireless access points or base stations, etc.

In an example, connectivity circuitries 1131 may include multiple different types of connectivity. To generalize, the connectivity circuitries 1131 may include cellular connectivity circuitries, wireless connectivity circuitries, etc. Cellular connectivity circuitries of connectivity circuitries 1131 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 1131 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 1131 may include a network interface, such as a wired or wireless interface, e.g., so that a system embodiment may be incorporated into a wireless device, for example, cell phone or personal digital assistant.

In some embodiments, device 1100 comprises control hub 1132, which represents hardware devices and/or software components related to interaction with one or more I/O devices. For example, processor 1104 may communicate with one or more of display 1122, one or more peripheral devices 1124, storage devices 1128, one or more other external devices 1129, etc., via control hub 1132. Control hub 1132 may be a chipset, a Platform Control Hub (PCH), and/or the like.

For example, control hub 1132 illustrates one or more connection points for additional devices that connect to device 1100, e.g., through which a user might interact with the system. For example, devices (e.g., devices 1129) that can be attached to device 1100 include microphone devices, speaker or stereo systems, audio devices, video systems or other display devices, keyboard or keypad devices, or other I/O devices for use with specific applications such as card readers or other devices.

As mentioned above, control hub 1132 can interact with audio devices, display 1122, etc. For example, input through a microphone or other audio device can provide input or commands for one or more applications or functions of device 1100. Additionally, audio output can be provided instead of, or in addition to display output. In another example, if display 1122 includes a touch screen, display 1122 also acts as an input device, which can be at least partially managed by control hub 1132. There can also be additional buttons or switches on computing device 1100 to provide I/O functions managed by control hub 1132. In one embodiment, control hub 1132 manages devices such as accelerometers, cameras, light sensors or other environmental sensors, or other hardware that can be included in device 1100. The input can be part of direct user interaction, as well as providing environmental input to the system to influence its operations (such as filtering for noise, adjusting displays for brightness detection, applying a flash for a camera, or other features).

In some embodiments, control hub 1132 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 1122 represents hardware (e.g., display devices) and software (e.g., drivers) components that provide a visual and/or tactile display for a user to interact with device 1100. Display 1122 may include a display interface, a display screen, and/or hardware device used to provide a display to a user. In some embodiments, display 1122 includes a touch screen (or touch pad) device that provides both output and input to a user. In an example, display 1122 may communicate directly with the processor 1104. Display 1122 can be one or more of an internal display device, as in a mobile electronic device or a laptop device or an external display device attached via a display interface (e.g., DisplayPort, etc.). In one embodiment display 1122 can be a head mounted display (HMD) such as a stereoscopic display device for use in virtual reality (VR) applications or augmented reality (AR) applications.

In some embodiments and although not illustrated in the figure, in addition to (or instead of) processor 1104, device 1100 may include Graphics Processing Unit (GPU) comprising one or more graphics processing cores, which may control one or more aspects of displaying contents on display 1122.

Control hub 1132 (or platform controller hub) may include hardware interfaces and connectors, as well as software components (e.g., drivers, protocol stacks) to make peripheral connections, e.g., to peripheral devices 1124.

It will be understood that device 1100 could both be a peripheral device to other computing devices, as well as have peripheral devices connected to it. Device 1100 may have a "docking" connector to connect to other computing devices for purposes such as managing (e.g., downloading and/or uploading, changing, synchronizing) content on device 1100. Additionally, a docking connector can allow device 1100 to connect to certain peripherals that allow computing device 1100 to control content output, for example, to audiovisual or other systems.

In addition to a proprietary docking connector or other proprietary connection hardware, device 1100 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 1131 may be coupled to control hub 1132, e.g., in addition to, or instead of, being coupled directly to the processor 1104. In some embodiments, display 1122 may be coupled to control hub 1132, e.g., in addition to, or instead of, being coupled directly to processor 1104.

In some embodiments, device 1100 comprises memory 1130 coupled to processor 1104 via memory interface 1134. Memory 1130 includes memory devices for storing information in device 1100. Memory can include nonvolatile (state does not change if power to the memory device is interrupted) and/or volatile (state is indeterminate if power to the memory device is interrupted) memory devices. Memory device 1130 can be a dynamic random access memory (DRAM) device, a static random access memory (SRAM) device, flash memory device, phase-change memory device, or some other memory device having suitable performance to serve as process memory. In one embodiment, memory 1130 can operate as system memory for device 1100, to store data and instructions for use when the one or more processors 1104 executes an application or process. Memory 1130 can store application data, user data, music, photos, documents, or other data, as well as system data (whether long-term or temporary) related to the execution of the applications and functions of device 1100.

Elements of various embodiments and examples are also provided as a machine-readable medium (e.g., memory 1130) for storing the computer-executable instructions (e.g., instructions to implement any other processes discussed herein). The machine-readable medium (e.g., memory 1130) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 1100 comprises temperature measurement circuitries 1140, e.g., for measuring temperature of various components of device 1100. In an example, temperature measurement circuitries 1140 may be embedded, or coupled or attached to various components, whose temperature are to be measured and monitored. For example, temperature measurement circuitries 1140 may measure temperature of (or within) one or more of cores 1108*a*, 1108*b*, 1108*c*, voltage regulator 1114, memory 1130, a mother-board of SOC 1101, and/or any appropriate component of device 1100.

In some embodiments, device 1100 comprises power measurement circuitries 1142, e.g., for measuring power consumed by one or more components of the device 1100. In an example, in addition to, or instead of, measuring power, the power measurement circuitries 1142 may measure voltage and/or current. In an example, the power measurement circuitries 1142 may be embedded, or coupled or attached to various components, whose power, voltage, and/or current consumption are to be measured and monitored. For example, power measurement circuitries 1142 may measure power, current and/or voltage supplied by one or more voltage regulators 1114, power supplied to SOC 1101, power supplied to device 1100, power consumed by processor 1104 (or any other component) of device 1100, etc.

In some embodiments, device 1100 comprises one or more voltage regulator circuitries, generally referred to as voltage regulator (VR) 1114. VR 1114 generates signals at appropriate voltage levels, which may be supplied to operate any appropriate components of the device 1100. Merely as an example, VR 1114 is illustrated to be supplying signals to processor 1104 of device 1100. In some embodiments, VR 1114 receives one or more Voltage Identification (VID) signals, and generates the voltage signal at an appropriate level, based on the VID signals. Various type of VRs may be utilized for the VR 1114. For example, VR 1114 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 1110*a/b* and/or PMIC 1112. In some embodiments, each core has a network of distributed LDOs to provide efficient control for power management. The LDOs can be digital, analog, or a combination of digital or analog LDOs.

In some embodiments, device 1100 comprises one or more clock generator circuitries, generally referred to as clock generator 1116. Clock generator 1116 generates clock signals at appropriate frequency levels, which may be supplied to any appropriate components of device 1100. Merely as an example, clock generator 1116 is illustrated to be supplying clock signals to processor 1104 of device 1100. In some embodiments, clock generator 1116 receives one or more Frequency Identification (FID) signals, and generates the clock signals at an appropriate frequency, based on the FID signals.

In some embodiments, device 1100 comprises battery 1118 supplying power to various components of device 1100. Merely as an example, battery 1118 is illustrated to be supplying power to processor 1104. Although not illustrated in the figures, device 1100 may comprise a charging circuitry, e.g., to recharge the battery, based on Alternating Current (AC) power supply received from an AC adapter.

In some embodiments, device 1100 comprises Power Control Unit (PCU) 1110 (also referred to as Power Management Unit (PMU), Power Controller, etc.). In an example, some sections of PCU 1110 may be implemented by one or more processing cores 1108, and these sections of PCU 1110 are symbolically illustrated using a dotted box and labelled PCU 1110*a*. In an example, some other sections of PCU 1110 may be implemented outside the processing cores 1108, and these sections of PCU 1110 are symbolically illustrated using a dotted box and labelled as PCU 1110*b*. PCU 1110 may implement various power management operations for device 1100. PCU 1110 may include hardware interfaces, hardware circuitries, connectors, registers, etc., as well as software components (e.g., drivers, protocol stacks), to implement various power management operations for device 1100.

In some embodiments, device 1100 comprises Power Management Integrated Circuit (PMIC) 1112, e.g., to implement various power management operations for device 1100. In some embodiments, PMIC 1112 is a Reconfigurable Power Management ICs (RPMICs) and/or an IMVP (Intel® Mobile Voltage Positioning). In an example, the PMIC is within an IC chip separate from processor 1104. The may implement various power management operations for device 1100. PMIC 1112 may include hardware interfaces, hardware circuitries, connectors, registers, etc., as well as software components (e.g., drivers, protocol stacks), to implement various power management operations for device 1100.

In an example, device 1100 comprises one or both PCU 1110 or PMIC 1112. In an example, any one of PCU 1110 or PMIC 1112 may be absent in device 1100, and hence, these components are illustrated using dotted lines.

Various power management operations of device 1100 may be performed by PCU 1110, by PMIC 1112, or by a combination of PCU 1110 and PMIC 1112. For example, PCU 1110 and/or PMIC 1112 may select a power state (e.g., P-state) for various components of device 1100. For example, PCU 1110 and/or PMIC 1112 may select a power state (e.g., in accordance with the ACPI (Advanced Configuration and Power Interface) specification) for various components of device 1100. Merely as an example, PCU 1110 and/or PMIC 1112 may cause various components of the device 1100 to transition to a sleep state, to an active state, to an appropriate C state (e.g., C0 state, or another appropriate C state, in accordance with the ACPI specification), etc. In an example, PCU 1110 and/or PMIC 1112 may control a voltage output by VR 1114 and/or a frequency of a clock signal output by the clock generator, e.g., by outputting the VID signal and/or the FID signal, respectively. In an example, PCU 1110 and/or PMIC 1112 may control battery power usage, charging of battery 1118, and features related to power saving operation.

The clock generator 1116 can comprise a phase locked loop (PLL), frequency locked loop (FLL), or any suitable clock source. In some embodiments, each core of processor 1104 has its own clock source. As such, each core can operate at a frequency independent of the frequency of operation of the other core. In some embodiments, PCU 1110 and/or PMIC 1112 performs adaptive or dynamic frequency scaling or adjustment. For example, clock frequency of a processor core can be increased if the core is not operating at its maximum power consumption threshold or limit. In some embodiments, PCU 1110 and/or PMIC 1112 determines the operating condition of each core of a processor, and opportunistically adjusts frequency and/or power supply voltage of that core without the core clocking source (e.g., PLL of that core) losing lock when the PCU 1110 and/or PMIC 1112 determines that the core is operating below a target performance level. For example, if a core is drawing current from a power supply rail less than a total current allocated for that core or processor 1104, then PCU 1110 and/or PMIC 1112 can temporarily increase the power draw for that core or processor 1104 (e.g., by increasing clock frequency and/or power supply voltage level) so that the core or processor 1104 can perform at higher performance level. As such, voltage and/or frequency can be increased temporarily for processor 1104 without violating product reliability.

In an example, PCU 1110 and/or PMIC 1112 may perform power management operations, e.g., based at least in part on receiving measurements from power measurement circuitries 1142, temperature measurement circuitries 1140, charge level of battery 1118, and/or any other appropriate information that may be used for power management. To that end, PMIC 1112 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 1110 and/or PMIC 1112 in at least one embodiment to allow PCU 1110 and/or PMIC 1112 to manage processor core energy at least in part based on value(s) detected by one or more of the sensors.

Also illustrated is an example software stack of device 1100 (although not all elements of the software stack are illustrated). Merely as an example, processors 1104 may execute application programs 1150, Operating System 1152, one or more Power Management (PM) specific application programs (e.g., generically referred to as PM applications 1158), and/or the like. PM applications 1158 may also be executed by the PCU 1110 and/or PMIC 1112. OS 1152 may also include one or more PM applications 1156*a*, 1156*b*, 1156*c*. The OS 1152 may also include various drivers 1154*a*, 1154*b*, 1154*c*, etc., some of which may be specific for power management purposes. In some embodiments, device 1100 may further comprise a Basic Input/Output System (BIOS) 1120. BIOS 1120 may communicate with OS 1152 (e.g., via one or more drivers 1154), communicate with processors 1104, etc.

For example, one or more of PM applications 1158, 1156, drivers 1154, BIOS 1120, etc. may be used to implement power management specific tasks, e.g., to control voltage and/or frequency of various components of device 1100, to control wake-up state, sleep state, and/or any other appropriate power state of various components of device 1100, control battery power usage, charging of the battery 1118, features related to power saving operation, etc. In some embodiments, voltage regulator 1114 monitors a voltage that is provided with battery 1118 to power processor 1104 and/or other load circuitry of SOC 1101. Voltage regulator 1114 includes (or alternatively, is coupled to) a circuit including an energy storage—e.g., comprising one or more capacitors—and a buck-boost charger that is coupled between the energy storage and battery 1118. During operation of computing device 1100, voltage regulator 1114 detects an indication that the voltage provided with voltage regulator 1114 has transitioned (or is expected to transition) below a threshold voltage level. In response to such detection, voltage regulator 1114 enters a protection mode to regulate the voltage in a range of voltage levels which are each above a minimum voltage level required for operation of the load circuit. At least a portion of the range is below the threshold voltage level.

Figure 12:
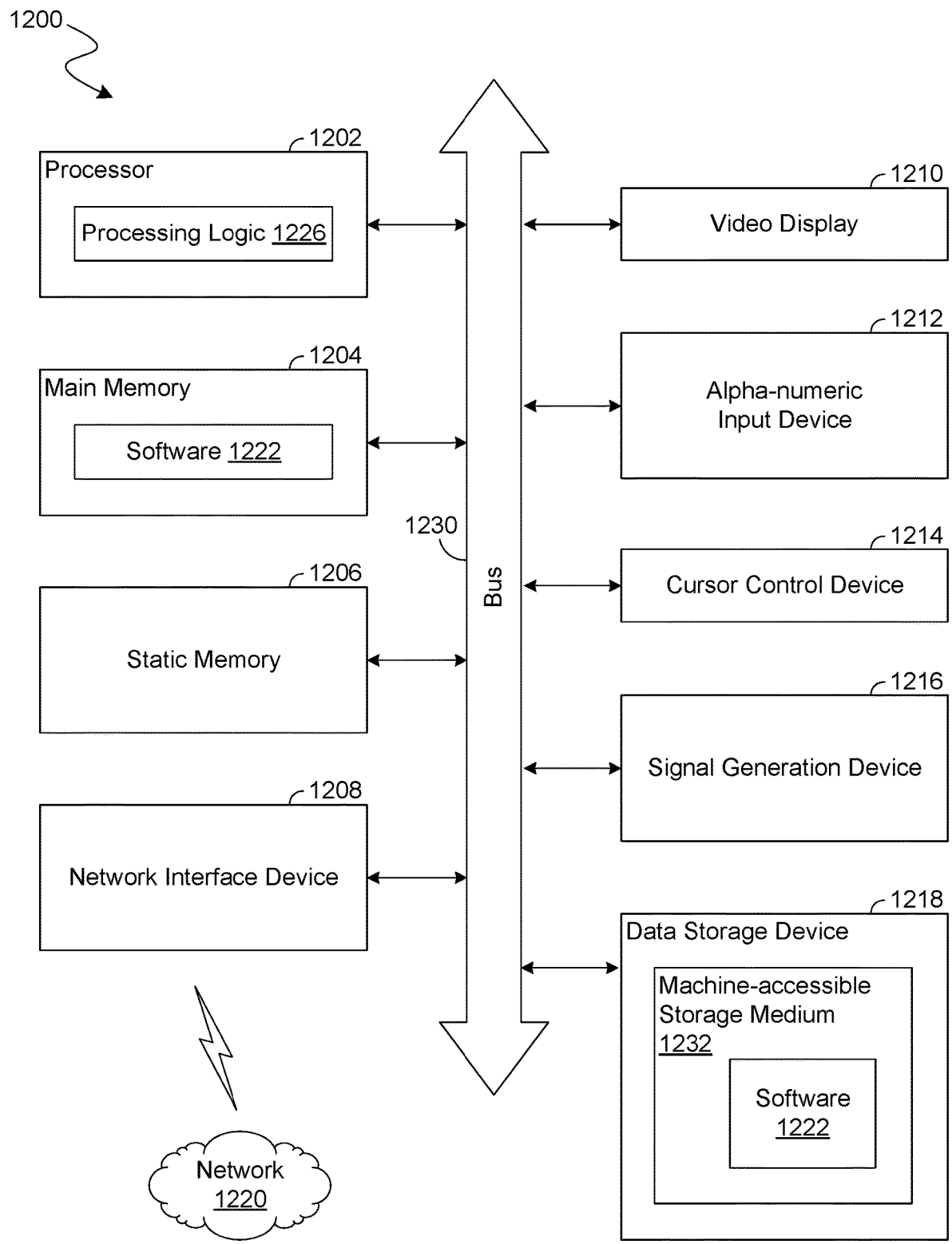
FIG. 12 is a functional block diagram illustrating an exemplary computer system, in accordance with one embodiment.

FIG. 12 illustrates a diagrammatic representation of a machine in the exemplary form of a computer system 1200 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 1200 includes a processor 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a secondary memory 1218 (e.g., a data storage device), which communicate with each other via a bus 1230.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1202 may also be one or more special-purpose processing devices such as an application specific integrated circuit (ASIC), a field programmable gate array (FPGA), a digital signal processor (DSP), network processor, or the like. Processor 1202 is configured to execute the processing logic 1226 for performing the operations described herein.

The computer system 1200 may further include a network interface device 1208. The computer system 1200 also may include a video display unit 1210 (e.g., a liquid crystal display (LCD), a light emitting diode display (LED), or a cathode ray tube (CRT)), an alphanumeric input device 1212 (e.g., a keyboard), a cursor control device 1214 (e.g., a mouse), and a signal generation device 1216 (e.g., a speaker).

The secondary memory 1218 may include a machine-accessible storage medium (or more specifically a computer-readable storage medium) 1232 on which is stored one or more sets of instructions (e.g., software 1222) embodying any one or more of the methodologies or functions described herein. The software 1222 may also reside, completely or at least partially, within the main memory 1204 and/or within the processor 1202 during execution thereof by the computer system 1200, the main memory 1204 and the processor 1202 also constituting machine-readable storage media. The software 1222 may further be transmitted or received over a network 1220 via the network interface device 1208.

While the machine-accessible storage medium 1232 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Techniques and architectures for regulating power delivery are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
a connector to couple the device to a power source;
a capacitor coupled to the connector, the capacitor to store energy from the power source;
a buck-boost charger coupled between a first node and a second node, wherein the buck-boost charger is coupled to the connector and to the capacitor via the first node;
a battery coupled to the buck-boost charger via the second node; and
circuitry coupled to the buck-boost charger, the circuitry to:
receive a signal while a first voltage is to be provided at the second node with the battery, wherein the signal indicates a transition of the first voltage below a first threshold voltage level;
based on the signal, to enter an operational mode to control the buck-boost charger to maintain the first voltage in a predetermined range of voltage levels, wherein the circuitry to maintain the first voltage in the range comprises:
the circuitry to enable a conductive path between the first node and the second node, via the buck-boost charger, to increase the first voltage based on a predetermined minimum voltage level of the range, wherein the minimum voltage level of the range is equal to or greater than a second threshold voltage level which is based on a minimum voltage requirement of a load which comprises a processor; and
the circuitry to subsequently disable the conductive path to decrease the first voltage based on a predetermined maximum voltage level of the range, wherein the maximum voltage level of the range is equal to or less than the first threshold voltage level;
perform an evaluation to determine that a second voltage at the first node is expected to be above a third threshold voltage level, wherein a detection of another transition of the second voltage below the third threshold voltage level is to result in an assertion of a control signal to throttle an operation of the processor;
determine, based on the evaluation, that the circuitry is to remain in the operational mode to maintain the first voltage in the range; and
exit the operational mode based on one of:
an indication that a consumption of power by the load is below a threshold power level; or
an indication that an amount of charge at the capacitor is below a threshold charge level.

2. The device of claim 1, wherein a difference between the first threshold voltage level and the minimum voltage level of the range is at least 10% of a difference between the first threshold voltage level and the second threshold voltage level.

3. The device of claim 1, wherein a difference between the maximum voltage level of the range and the second threshold voltage level is at least 30% of a difference between the first threshold voltage level and the second threshold voltage level.

4. The device of claim 1, wherein a difference between the first threshold voltage level and the maximum voltage level of the range is at least 10% of a difference between the first threshold voltage level and the second threshold voltage level.

5. The device of claim 1, wherein a difference between the maximum voltage level of the range and the second threshold voltage level is less than 20% of a difference between the first threshold voltage level and the second threshold voltage level.

6. The device of claim 1, the circuitry further to detect a change to the first threshold voltage level, wherein the circuitry is to detect the transition further based on the change.

7. The device of claim 1, wherein the circuitry is further to:
receive a second signal which indicates the other transition of the second voltage below the third threshold voltage level; and
based on the second signal, to provide the assertion of the control signal to throttle the operation of the processor.

8. The device of claim 1, wherein, based on the indication that the consumption of power by the load is below the threshold power level, the circuitry is further to enter another operational mode which enables the first voltage to be above the first threshold voltage level.

9. One or more non-transitory computer-readable storage media having stored thereon instructions which, when executed by one or more processing units, cause the one or more processing units to perform a method comprising: receiving a signal while a first voltage is provided with a battery at a first node to power a load which comprises a processor, wherein a buck-boost charger is coupled between the first node and a second node, wherein the buck-boost charger is coupled both to a connector and to a capacitor via the second node, the connector to couple the second node and the capacitor to a power source; based on the signal, detecting a transition of the first voltage below a first threshold voltage level; based on the detecting, controlling the buck-boost charger to maintain the first voltage in a predetermined range of voltage levels, wherein maintaining the first voltage in the range comprises: enabling a conductive path between the first node and the second node, via the buck-boost charger, to increase the first voltage based on a predetermined minimum voltage level of the range, wherein the minimum voltage level of the range is equal to or greater than a second threshold voltage level which is based on a minimum voltage requirement of the load; and subsequent to the enabling, disabling the conductive path to decrease the first voltage based on a predetermined maximum voltage level of the range, wherein the maximum voltage level of the range is equal to or less than the first threshold voltage level; performing an evaluation to determine that a second voltage at the second node is expected to be above a third threshold voltage level, wherein a detection of another transition of the second voltage below the third threshold voltage level is to result in an assertion of a control signal to throttle an operation of the processor; determining, based on the evaluation, to remain in an operational mode to maintain the first voltage in the range; and exiting the operational mode based on one of: an indication that a consumption of power by the load is below a threshold power level; or an indication that an amount of charge at the capacitor is below a threshold charge level.

10. The one or more computer-readable storage media of claim 9, wherein a difference between the first threshold voltage level and the minimum voltage level of the range is at least 10% of a difference between the first threshold voltage level and the second threshold voltage level.

11. The one or more computer-readable storage media of claim 9, wherein a difference between the maximum voltage level of the range and the second threshold voltage level is at least 30% of a difference between the first threshold voltage level and the second threshold voltage level.

12. The one or more computer-readable storage media of claim 9, wherein a difference between the maximum voltage level of the range and the second threshold voltage level is less than 20% of a difference between the first threshold voltage level and the second threshold voltage level.

13. The one or more computer-readable storage media of claim 9, the method further comprising:
receiving a second signal which indicates the other transition of the second voltage below the third threshold voltage level; and
based on the second signal, providing the assertion of the control signal to throttle the operation of the processor.

14. The one or more computer-readable storage media of claim 9, the method further comprising:
based on the indication that the consumption of power by the load is below the threshold power level, operating the buck boost charger to enable the first voltage to be above the first threshold voltage level.

15. A system comprising:
an integrated circuit (IC) chip comprising:
a connector to couple the IC chip to a power source;
a capacitor coupled to the connector, the capacitor to store energy from the power source;
a buck-boost charger coupled between a first node and a second node, wherein the buck-boost charger is coupled to the connector and to the capacitor via the first node;
a battery coupled to the buck-boost charger via the second node; and
circuitry coupled to the buck-boost charger, the circuitry to:
receive a signal while a first voltage is to be provided at the second node with the battery, wherein the signal indicates a transition of the first voltage below a first threshold voltage level;
based on the signal, to enter an operational mode to control the buck-boost charger to maintain the first voltage in a predetermined range of voltage levels, wherein the circuitry to maintain the first voltage in the range comprises:
the circuitry to enable a conductive path between the first node and the second node, via the buck-boost charger, to increase the first voltage based on a predetermined minimum voltage level of the range, wherein the minimum voltage level of the range is equal to or greater than a second threshold voltage level which is based on a minimum voltage requirement of a load which comprises a processor; and
the circuitry to subsequently disable the conductive path to decrease the first voltage based on a predetermined maximum voltage level of the range, wherein the maximum voltage level of the range is equal to or less than the first threshold voltage level;
perform an evaluation to determine that a second voltage at the first node is expected to be above a third threshold voltage level, wherein a detection of another transition of the second voltage below the third threshold voltage level is to result in an assertion of a control signal to throttle an operation of the processor;
determine, based on the evaluation, that the circuitry is to remain in the operational mode to maintain the first voltage in the range; and
exit the operational mode based on one of:
an indication that a consumption of power by the load is below a threshold power level; or
an indication that an amount of charge at the capacitor is below a threshold charge level; and
a display device coupled to the IC chip, the display device to display an image based on a signal communicated with the IC chip.

16. The system of claim 15, wherein a difference between the first threshold voltage level and the minimum voltage level of the range is at least 10% of a difference between the first threshold voltage level and the second threshold voltage level.

17. The system of claim 15, wherein a difference between the maximum voltage level of the range and the second threshold voltage level is at least 30% of a difference between the first threshold voltage level and the second threshold voltage level.

18. The system of claim 15, wherein a difference between the maximum voltage level of the range and the second threshold voltage level is less than 20% of a difference between the first threshold voltage level and the second threshold voltage level.

19. The system of claim 15, wherein the circuitry is further to:
receive a second signal which indicates a transition of another voltage below a second threshold voltage level; and
based on the second signal, to generate a control signal to throttle an operation of a processor.

20. The system of claim 15, wherein, based on the indication that the consumption of power by the load is below the threshold power level, the circuitry is further to enter another operational mode which enables the first voltage to be above the first threshold voltage level.

* * * * *